United States Patent
Cheng et al.

(10) Patent No.: US 11,576,206 B2
(45) Date of Patent: Feb. 7, 2023

(54) MULTEFIRE AUTONOMOUS UPLINK CHANNEL CLEARANCE SIGNALING

(71) Applicant: Qualcomm Incorporated, San Diego, CA (US)

(72) Inventors: Peng Cheng, Beijing (CN); Vinay Chande, San Diego, CA (US); Arumugam Chendamarai Kannan, San Diego, CA (US); Chirag Patel, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/326,290

(22) PCT Filed: Sep. 22, 2017

(86) PCT No.: PCT/CN2017/102865
§ 371 (c)(1),
(2) Date: Feb. 18, 2019

(87) PCT Pub. No.: WO2018/059311
PCT Pub. Date: Apr. 5, 2018

(65) Prior Publication Data
US 2019/0215867 A1    Jul. 11, 2019

(30) Foreign Application Priority Data

Sep. 30, 2016 (WO) ............... PCT/CN2016/101083
Sep. 30, 2016 (WO) ............... PCT/CN2016/101243

(51) Int. Cl.
*H04W 74/08* (2009.01)
*H04W 72/12* (2009.01)
(Continued)

(52) U.S. Cl.
CPC ....... *H04W 74/0816* (2013.01); *H04W 8/005* (2013.01); *H04W 24/10* (2013.01);
(Continued)

(58) Field of Classification Search
CPC ......... H04W 74/0816; H04W 74/0808; H04W 52/0225; H04W 8/005; H04W 24/10;
(Continued)

(56) References Cited

U.S. PATENT DOCUMENTS 9,426,035 B2    8/2016  Shetty et al.
9,693,369 B2 *  6/2017  Nilsson ............. H04W 72/1226
(Continued)

FOREIGN PATENT DOCUMENTS

WO    WO-2014111309 A1    7/2014
WO    WO-2015134907 A1    9/2015
(Continued)

OTHER PUBLICATIONS

Ratasuk R., et al., "License-Exempt LTE Deployment in Heterogeneous Network", IEEE, International Symposium on Wireless Communication Systems (ISWCS), Aug. 28, 2012 (Aug. 28, 2012), pp. 246-250, XP032263759, DOI: 10.1109/ISWCS.2012.6328367, ISBN: 978-1-4673-0761-1.
(Continued)

*Primary Examiner* — Christopher P Grey
(74) *Attorney, Agent, or Firm* — Holland & Hart LLP

(57) ABSTRACT

Methods, systems, and devices for wireless communication are described. A base station may determine a measurement scheme or uplink mode and then transmit an indication of the scheme or uplink mode to an associated user equipment (UE). The base station may identify a set of hidden nodes for the UE and configure the UE for autonomous or grant-based uplink transmissions accordingly. A UE may initiate a channel clearance scheme by transmitting a first channel clear-
(Continued)

ance signal (e.g., a request-to-send message), which may include a UE identifier before transmitting an uplink message in the unlicensed radio frequency spectrum band. In response, the base station may transmit a second channel clearance signal (e.g., a clear-to-send message). In some cases, the second channel clearance signal may include control information or may be transmitted at a power level that is based on a characteristic of the UE.

17 Claims, 24 Drawing Sheets

(51) Int. Cl.

| | | |
|---|---|---|
| *H04W 52/02* | (2009.01) | |
| *H04W 8/00* | (2009.01) | |
| *H04W 24/10* | (2009.01) | |
| *H04W 52/24* | (2009.01) | |
| *H04W 72/14* | (2009.01) | |
| *H04W 74/00* | (2009.01) | |
| *H04W 76/27* | (2018.01) | |

(52) U.S. Cl.
CPC ..... *H04W 52/0225* (2013.01); *H04W 52/245* (2013.01); *H04W 72/1205* (2013.01); *H04W 72/14* (2013.01); *H04W 74/004* (2013.01); *H04W 74/0808* (2013.01); *H04W 76/27* (2018.02)

(58) Field of Classification Search
CPC . H04W 52/245; H04W 72/14; H04W 74/004; H04W 72/1205; H04W 76/27; H04W 16/14; Y02D 30/70
See application file for complete search history.

(56) References Cited

U.S. PATENT DOCUMENTS

| | | | | |
|---|---|---|---|---|
| 10,033,490 | B2* | 7/2018 | Sadeghi | H04L 1/1822 |
| 10,154,514 | B2* | 12/2018 | Luo | H04W 72/1236 |
| 10,285,202 | B2* | 5/2019 | Chu | H04W 74/0816 |
| 10,341,884 | B2* | 7/2019 | Sun | H04B 7/0632 |
| 10,492,220 | B2* | 11/2019 | Sun | H04L 27/0006 |
| 2004/0219920 | A1* | 11/2004 | Love | H04W 52/221 455/442 |
| 2009/0067448 | A1 | 3/2009 | Stanwood et al. | |
| 2012/0188963 | A1* | 7/2012 | Iwamura | H04W 72/1263 370/329 |
| 2012/0207036 | A1* | 8/2012 | Ong | H04W 74/0816 370/252 |
| 2013/0148517 | A1* | 6/2013 | Abraham | H04W 52/04 370/252 |
| 2014/0341018 | A1* | 11/2014 | Bhushan | H04W 28/16 370/230 |
| 2015/0124744 | A1* | 5/2015 | Zhu | H04W 72/1257 370/329 |
| 2015/0201401 | A1* | 7/2015 | Lahetkangas | H04W 28/26 370/329 |
| 2015/0215867 | A1 | 7/2015 | Choi et al. | |
| 2016/0028060 | A1 | 1/2016 | Pekala et al. | |
| 2016/0113036 | A1 | 4/2016 | Stephens et al. | |
| 2016/0128024 | A1 | 5/2016 | Frederiks et al. | |
| 2016/0286545 | A1 | 9/2016 | Luo et al. | |
| 2016/0366201 | A1* | 12/2016 | Barsness | G06F 16/24568 |
| 2018/0227936 | A1* | 8/2018 | Yerramalli | H04L 1/1822 |
| 2019/0029045 | A1* | 1/2019 | Li | H04W 72/1289 |
| 2019/0104549 | A1* | 4/2019 | Deng | H04B 7/0617 |
| 2019/0191315 | A1* | 6/2019 | Mukherjee | H04W 72/085 |
| 2020/0187228 | A1* | 6/2020 | Cheng | H04W 72/1289 |

FOREIGN PATENT DOCUMENTS

| | | | |
|---|---|---|---|
| WO | WO 2016/028060 A1 | 2/2016 | |
| WO | WO-2016086985 A1 | 6/2016 | |
| WO | WO 2016/115680 A1 | 7/2016 | |
| WO | WO-2016126833 | 8/2016 | |

OTHER PUBLICATIONS

Supplementary Partial European Search Report—EP17854761—Search Authority—Munich—dated Apr. 15, 2020.
International Search Report and Written Opinion—PCT/CN2016/101243—ISA/EPO—dated May 31, 2017.
International Search Report and Written Opinion—PCT/CN2017/102865—ISA/EPO—dated Nov. 28, 2017.
Alcatel-Lucent Shanghai Bell., et al., "Hidden Node Problem and Potential Solutions for LAA", , 3GPP Draft, 3GPP TSG RAN WG1 Meeting #79, R1-144703—Hidden Node—Final, 3rd Generation Partnership Project (3GPP), Mobile Competence Centre, 650, Route Des Lucioles, F-06921 Sophia-Antipolis Cedex, France, vol. RAN WG1, No. San Francisco, USA, Nov. 17, 2014-Nov. 21, 2014, Nov. 8, 2014 (Nov. 8, 2014), XP050895086, pp. 1-4, Retrieved from the Internet: URL: https://www.3gpp.org/ftp/tsg_ran/wg1_rl1/TSGR1_79/Docs/[retrieved on Nov. 8, 2014].
Kyocera: "Further Considerations on the Essential Functionalities for LAA," 3GPP Draft, 3GPP TSG RAN WG1 Meeting #79, R1-144955, 3rd Generation Partnership Project (3GPP), Mobile Competence Centre, 650, Route Des Lucioles, F-06921 Sophia-Anti Polis Cedex, France, vol. RAN WG1, No. San Francisco, Nov. 17, 2014-Nov. 21, 2014, Nov. 8, 2014, XP050895108, 10 Pages, Retrieved from the Internet: http://www.3gpp.org/ftp/tsg_ran/WG1_RL1/TSGR1_79/Docs/R1-144955.zip [Accessed Oct. 27, 2017], Section 3.2.
Supplementary European Search Report—EP17854761—Search Authority—Munich—dated Jul. 1, 2020.
Broadcom Corporation: "Issues for a High Performance Unlicensed Spectrum Access Protocol for 5G," 3GPP TSG RAN 5G Workshop, RWS-150045 Broadcom_Final, 3rd Generation Partnership Project (3GPP), Mobile Competence Centre, 650, Route Des Lucioles, F-06921 Sophia-Antipolis Cedex, France, vol. TSG RAN, No. Phoenix, AZ, Sep. 17, 2015-Sep. 18, 2015, Sep. 3, 2015, XP051017193, 7 pages.

* cited by examiner

MULTEFIRE AUTONOMOUS UPLINK CHANNEL CLEARANCE SIGNALING

CROSS REFERENCES

The present 371 application for patent claims priority to PCT Patent Application No. PCT/CN2017/102865 by CIENG, et al., entitled "MULTEFIRE AUTONOMOUS UPLINK CHANNEL CLEARANCE SIGNALING", filed Sep. 22, 2017, and to PCT Patent Application No. PCT/CN2016/101243 by CHENG et al., entitled "AUTONOMOUS UPLINK BENEFIT IDENTIFICATION", filed Sep. 30, 2016, and to PCT Patent Application No. PCT/CN2016/101083 by CHENG et al., entitled "AUTONOMOUS UPLINK BENEFIT IDENTIFICATION", filed Sep. 30, 2016 each of which is assigned to the assignee hereof.

BACKGROUND

The following relates generally to wireless communication and more specifically to autonomous uplink channel clearance signaling for mobile devices in an unlicensed radio frequency spectrum band.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

SUMMARY

The described techniques relate to improved methods, systems, devices, or apparatuses that support autonomous uplink benefit identification and channel clearance signaling. Generally, the described techniques may provide for identifying a node capable of operating in an autonomous uplink mode. Once such a node is identified, it may be configured to operate in the autonomous uplink mode.

For example, a base station may determine a number of hidden nodes associated with a given node (e.g., a UE). Based on the number of hidden nodes, the base station may configure the UE to operate in an autonomous uplink mode. To determine whether neighbor nodes are hidden nodes, a UE may determine the signal strength of neighboring nodes by measuring signals from the neighboring nodes according to different measurement schemes. Based on the measurements, the UE may transmit an indication to the base station that includes information (e.g., signal strength) related to the neighboring nodes or may transmit a set of nodes whose received signal strength is above a threshold.

A UE operating in a shared or unlicensed radio frequency spectrum band may initiate a channel clearance procedure before transmitting in order to confirm channel availability and avoid interference. For example, the UE may be configured to operate in the autonomous uplink mode, which may support unscheduled uplink transmissions in an unlicensed radio frequency spectrum band. The UE may transmit a first channel clearance signal (e.g., a request-to-send message) to a base station in the unlicensed radio frequency spectrum band. In response, the base station may transmit a second channel clearance signal (e.g., a clear-to-send message) to the UE. In some cases, the first and/or second channel clearance signals may include control information. After receiving the second channel clearance signal, the UE may transmit an uplink message in the autonomous uplink mode.

A method of wireless communication is described. The method may include selecting an autonomous uplink mode for transmission in an unlicensed radio frequency spectrum band, wherein the autonomous uplink mode supports unscheduled uplink transmissions, transmitting a first channel clearance signal based at least in part on selecting the autonomous uplink mode, receiving a second channel clearance signal from a base station in response to the first channel clearance signal, and transmitting an uplink message in the unlicensed radio frequency spectrum band according to the autonomous uplink mode, wherein the uplink message is transmitted based at least in part on receiving the second channel clearance signal.

An apparatus for wireless communication is described. The apparatus may include means for selecting an autonomous uplink mode for transmission in an unlicensed radio frequency spectrum band, wherein the autonomous uplink mode supports unscheduled uplink transmissions, means for transmitting a first channel clearance signal based at least in part on selecting the autonomous uplink mode, means for receiving a second channel clearance signal from a base station in response to the first channel clearance signal, and means for transmitting an uplink message in the unlicensed radio frequency spectrum band according to the autonomous uplink mode, wherein the uplink message is transmitted based at least in part on receiving the second channel clearance signal.

Another apparatus for wireless communication is described. The apparatus may include a processor, memory in electronic communication with the processor, and instructions stored in the memory. The instructions may be executable by the processor to cause the apparatus to select an autonomous uplink mode for transmission in an unlicensed radio frequency spectrum band, wherein the autonomous uplink mode supports unscheduled uplink transmissions, transmit a first channel clearance signal based at least in part on selecting the autonomous uplink mode, receive a second channel clearance signal from a base station in response to the first channel clearance signal, and transmit an uplink message in the unlicensed radio frequency spectrum band according to the autonomous uplink mode, wherein the uplink message is transmitted based at least in part on receiving the second channel clearance signal.

A non-transitory computer readable medium for wireless communication is described. The non-transitory computer-readable medium may include instructions operable to select an autonomous uplink mode for transmission in an unlicensed radio frequency spectrum band, wherein the autonomous uplink mode supports unscheduled uplink transmissions, transmit a first channel clearance signal based at least in part on selecting the autonomous uplink mode, receive a second channel clearance signal from a base station in response to the first channel clearance signal, and transmit an uplink message in the unlicensed radio frequency spectrum band according to the autonomous uplink mode, wherein the uplink message is transmitted based at least in part on receiving the second channel clearance signal.

Some examples of the methods, apparatuses, and non-transitory computer-readable media described herein may further include processes, features, means, or instructions for performing a successful CCA before transmitting the first channel clearance signal, wherein a format of the CCA may be based at least in part on the autonomous uplink mode and the first channel clearance signal may be transmitted based at least in part on the successful CCA.

Some examples of the methods, apparatuses, and non-transitory computer-readable media described herein may further include processes, features, means, or instructions for receiving, from the base station, a radio resource control (RRC) message that comprises a configuration for channel clearance signaling, wherein the first channel clearance signal may be transmitted based at least in part on receiving the configuration.

In some examples of the methods, apparatuses, and non-transitory computer-readable media described herein, the first channel clearance signal comprises a RTS message and the second channel clearance signal comprises a CTS message. In some examples of the method, apparatus, and non-transitory computer-readable medium described above, the first channel clearance signal comprises a UE identifier.

In some examples of the methods, apparatuses, and non-transitory computer-readable media described herein, the second channel clearance signal comprises a frame structure indication. In some examples of the method, apparatus, and non-transitory computer-readable medium described above, the frame structure indication comprises a time division duplex (TDD) configuration for the autonomous uplink mode.

In some examples of the methods, apparatuses, and non-transitory computer-readable media described herein, the second channel clearance signal comprises a modulation and coding scheme for the autonomous uplink mode, a transmission opportunity (TxOP) duration for the autonomous uplink mode, or hybrid automatic repeat request (HARQ) information for the autonomous uplink mode, or any combination thereof. In some examples of the methods, apparatuses, and non-transitory computer-readable media described herein, the first channel clearance signal may be transmitted and the second channel clearance signal may be received in a same transmission time interval (TTI).

Some examples of the methods, apparatuses, and non-transitory computer-readable media described herein may further include processes, features, means, or instructions for determining a power level for transmission of the first channel clearance signal based at least in part on a characteristic of another UE. Some examples of the methods, apparatuses, and non-transitory computer-readable media described herein may further include processes, features, means, or instructions for transmitting the first channel clearance signal based at least in part on the determined power level.

Some examples of the methods, apparatuses, and non-transitory computer-readable media described herein may further include processes, features, means, or instructions for determining a power level associated with the second channel clearance signal, wherein the uplink message may be transmitted according to the autonomous uplink mode based at least in part on the determined power level.

Some examples of the methods, apparatuses, and non-transitory computer-readable media described herein may further include processes, features, means, or instructions for identifying a signal strength indicator associated with a neighbor wireless node, wherein the uplink message may be transmitted according to the autonomous uplink mode based at least in part on the identified signal strength indicator. In some examples of the method, apparatus, and non-transitory computer-readable medium described above, the first channel clearance signal comprises a UE identifier.

A method of wireless communication is described. The method may include selecting an autonomous uplink mode for communication in an unlicensed radio frequency spectrum band with a user equipment, wherein the autonomous uplink mode supports unscheduled uplink transmissions, receiving a first channel clearance signal from the UE based at least in part on selecting the autonomous uplink mode, transmitting a second channel clearance signal to the UE in response to the first channel clearance signal, and receiving an uplink message from the UE in the unlicensed radio frequency spectrum band according to the autonomous uplink mode and based at least in part on receiving the second channel clearance signal.

An apparatus for wireless communication is described. The apparatus may include means for selecting an autonomous uplink mode for communication in an unlicensed radio frequency spectrum band with a user equipment, wherein the autonomous uplink mode supports unscheduled uplink transmissions, means for receiving a first channel clearance signal from the UE based at least in part on selecting the autonomous uplink mode, means for transmitting a second channel clearance signal to the UE in response to the first channel clearance signal, and means for receiving an uplink message from the UE in the unlicensed radio frequency spectrum band according to the autonomous uplink mode and based at least in part on receiving the second channel clearance signal.

Another apparatus for wireless communication is described. The apparatus may include a processor, memory in electronic communication with the processor, and instructions stored in the memory. The instructions may be executable by the processor to cause the apparatus to select an autonomous uplink mode for communication in an unlicensed radio frequency spectrum band with a user equipment, wherein the autonomous uplink mode supports unscheduled uplink transmissions, receive a first channel clearance signal from the UE based at least in part on selecting the autonomous uplink mode, transmit a second channel clearance signal to the UE in response to the first channel clearance signal, and receive an uplink message from the UE in the unlicensed radio frequency spectrum band according to the autonomous uplink mode and based at least in part on receiving the second channel clearance signal.

A non-transitory computer readable medium for wireless communication is described. The non-transitory computer-readable medium may include instructions executable to select an autonomous uplink mode for communication in an unlicensed radio frequency spectrum band with a user equipment, wherein the autonomous uplink mode supports unscheduled uplink transmissions, receive a first channel clearance signal from the UE based at least in part on selecting the autonomous uplink mode, transmit a second channel clearance signal to the UE in response to the first channel clearance signal, and receive an uplink message from the UE in the unlicensed radio frequency spectrum band according to the autonomous uplink mode and based at least in part on receiving the second channel clearance signal.

Some examples of the methods, apparatuses, and non-transitory computer-readable media described herein may further include processes, features, means, or instructions for transmitting, to the UE, a radio resource control message that comprises a configuration for channel clearance signaling, wherein the second channel clearance signal may be transmitted based at least in part on transmitting the configuration.

Some examples of the methods, apparatuses, and non-transitory computer-readable media described herein may further include processes, features, means, or instructions for identifying one or more hidden nodes for the UE, wherein the RRC message may be transmitted based at least in part on identifying the one or more hidden nodes.

In some examples of the methods, apparatuses, and non-transitory computer-readable media described herein, at least one of the one or more hidden nodes may be another UE associated with a same base station. In some examples of the methods, apparatuses, and non-transitory computer-readable media described herein, the first channel clearance signal comprises a RTS message and the second channel clearance signal comprises a CTS message.

In some examples of the methods, apparatuses, and non-transitory computer-readable media described herein, the second channel clearance signal comprises a modulation and coding scheme for the autonomous uplink mode, a TxOP duration for the autonomous uplink mode, or HARQ information for the autonomous uplink mode, or any combination thereof. In some examples of the methods, apparatuses, and non-transitory computer-readable media described herein, the second channel clearance signal comprises a frame structure indication.

In some examples of the methods, apparatuses, and non-transitory computer-readable media described herein, the frame structure indication comprises a TDD configuration for the autonomous uplink mode. In some examples of the methods, apparatuses, and non-transitory computer-readable media described herein, the first channel clearance signal may be received and the second channel clearance signal may be transmitted in a same TTI.

Some examples of the methods, apparatuses, and non-transitory computer-readable media described herein may further include processes, features, means, or instructions for determining a power level for transmission of the second channel clearance signal based at least in part on a characteristic of another UE. Some examples of the methods, apparatuses, and non-transitory computer-readable media described herein may further include processes, features, means, or instructions for transmitting the second channel clearance signal based at least in part on the determined power level.

A method of wireless communication is described. The method may include identifying a set of hidden nodes for a UE, selecting an autonomous uplink mode for the UE based at least in part on identifying the set of hidden nodes, wherein the autonomous uplink mode supports unscheduled uplink transmissions, and transmitting an indication of the autonomous uplink mode to the UE.

An apparatus for wireless communication is described. The apparatus may include means for identifying a set of hidden nodes for a UE, means for selecting an autonomous uplink mode for the UE based at least in part on identifying the set of hidden nodes, wherein the autonomous uplink mode supports unscheduled uplink transmissions, and means for transmitting an indication of the autonomous uplink mode to the UE.

Another apparatus for wireless communication is described. The apparatus may include a processor, memory in electronic communication with the processor, and instructions stored in the memory. The instructions may be executable by the processor to cause the apparatus to identify a set of hidden nodes for a UE, select an autonomous uplink mode for the UE based at least in part on identifying the set of hidden nodes, wherein the autonomous uplink mode supports unscheduled uplink transmissions, and transmit an indication of the autonomous uplink mode to the UE.

A non-transitory computer readable medium for wireless communication is described. The non-transitory computer-readable medium may include instructions operable to cause a processor to identify a set of hidden nodes for a UE, select an autonomous uplink mode for the UE based at least in part on identifying the set of hidden nodes, wherein the autonomous uplink mode supports unscheduled uplink transmissions, and transmit an indication of the autonomous uplink mode to the UE.

In some examples of the methods, apparatuses, and non-transitory computer-readable media described herein, identifying the set of hidden nodes for the UE comprises: determining that a number of hidden nodes in the set may be below a threshold. In some examples of the methods, apparatuses, and non-transitory computer-readable media described herein, identifying the set of hidden nodes for the UE comprises: determining that a signal strength for each hidden node in the set may be below a threshold.

Some examples of the methods, apparatuses, and non-transitory computer-readable media described herein may further include processes, features, means, or instructions for receiving information associated with a hidden node of the set from the UE, wherein the autonomous uplink mode may be selected based at least in part on the information associated with the hidden node. In some examples of the methods, apparatuses, and non-transitory computer-readable media described herein, the information associated with the hidden node comprises a list of information associated with hidden nodes of the set.

In some examples of the methods, apparatuses, and non-transitory computer-readable media described herein, the information associated with the hidden node comprises an indication of a signal strength of the hidden node at the UE.

In some examples of the methods, apparatuses, and non-transitory computer-readable media described herein, transmitting the indication of the autonomous uplink mode comprises: transmitting the indication of the autonomous uplink mode in a RRC message.

Some examples of the methods, apparatuses, and non-transitory computer-readable media described herein may further include processes, features, means, or instructions for measuring a channel metric for the UE. Some examples of the methods, apparatuses, and non-transitory computer-readable media described herein may further include processes, features, means, or instructions for determining that the channel metric may be above a threshold. Some examples of the methods, apparatuses, and non-transitory computer-readable media described herein may further include processes, features, means, or instructions for transmitting an indication to operate in a grant-based mode to the UE, wherein the grant-based mode supports uplink transmissions using resources assigned by a grant.

Some examples of the methods, apparatuses, and non-transitory computer-readable media described herein may further include processes, features, means, or instructions for generating a channel metric histogram for the UE, wherein the channel metric histogram may be generated based at least in part on uplink feedback from the UE.

In some examples of the methods, apparatuses, and non-transitory computer-readable media described herein, the channel metric comprises a CQI backoff, a contention window metric, or a combination thereof.

Some examples of the methods, apparatuses, and non-transitory computer-readable media described herein may further include processes, features, means, or instructions for transmitting a measurement scheme to the UE. Some examples of the methods, apparatuses, and non-transitory computer-readable media described herein may further include processes, features, means, or instructions for receiving information associated with a hidden node of the set from the UE, wherein the information associated with the hidden node comprises a signal strength indication that may be based at least in part on the measurement scheme. In some examples of the methods, apparatuses, and non-transitory computer-readable media described herein, the set of hidden nodes may be identified based at least in part on the information associated with the hidden node received from the UE.

In some examples of the methods, apparatuses, and non-transitory computer-readable media described herein, the measurement scheme comprises an indication to measure a neighboring node and the neighboring node comprises at least one of a UE, a base station, an access point, or a station, or any combination thereof.

In some examples of the methods, apparatuses, and non-transitory computer-readable media described herein, the measurement scheme comprises a periodic report type and a report interval or a triggered report type.

Another method of wireless communication is described. The method may include measuring a signal from a neighboring node in an unlicensed radio frequency spectrum band, transmitting information associated with the measurement to a base station, receiving an RRC message from the base station, the RRC message comprising an indication from the base station to operate in an autonomous uplink mode based at least in part on the information associated with the measurement, wherein the autonomous uplink mode supports unscheduled uplink transmissions in the unlicensed radio frequency spectrum band, and transmitting an uplink message to the base station according to the autonomous uplink mode.

Another apparatus for wireless communication is described. The apparatus may include means for measuring a signal from a neighboring node in an unlicensed radio frequency spectrum band, means for transmitting information associated with the measurement to a base station, means for receiving an RRC message from the base station, the RRC message comprising an indication from the base station to operate in an autonomous uplink mode based at least in part on the information associated with the measurement, wherein the autonomous uplink mode supports unscheduled uplink transmissions in the unlicensed radio frequency spectrum band, and means for transmitting an uplink message to the base station according to the autonomous uplink mode.

Another apparatus for wireless communication is described. The apparatus may include a processor, memory in electronic communication with the processor, and instructions stored in the memory. The instructions may be executable by the processor to cause the apparatus to measure a signal from a neighboring node in an unlicensed radio frequency spectrum band, transmit information associated with the measurement to a base station, receive an RRC message from the base station, the RRC message comprising an indication from the base station to operate in an autonomous uplink mode based at least in part on the information associated with the measurement, wherein the autonomous uplink mode supports unscheduled uplink transmissions in the unlicensed radio frequency spectrum band, and transmit an uplink message to the base station according to the autonomous uplink mode.

A non-transitory computer readable medium for wireless communication is described. The non-transitory computer-readable medium may include instructions operable to cause a processor to measure a signal from a neighboring node in an unlicensed radio frequency spectrum band, transmit information associated with the measurement to a base station, receive an RRC message from the base station, the RRC message comprising an indication from the base station to operate in an autonomous uplink mode based at least in part on the information associated with the measurement, wherein the autonomous uplink mode supports unscheduled uplink transmissions in the unlicensed radio frequency spectrum band, and transmit an uplink message to the base station according to the autonomous uplink mode.

Some examples of the methods, apparatuses, and non-transitory computer-readable media described herein may further include processes, features, means, or instructions for determining that a strength of the signal from the neighboring node exceeds a threshold, wherein the information associated with the measurement may be transmitted based at least in part on the determination that the strength of the signal from the neighboring node exceeds the threshold.

In some examples of the methods, apparatuses, and non-transitory computer-readable media described herein, the information associated with the measurement comprises an element in a list of neighboring nodes having a signal strength that exceeds a threshold, and transmitting the information comprises: transmitting a message with the list of neighboring nodes.

Some examples of the methods, apparatuses, and non-transitory computer-readable media described herein may further include processes, features, means, or instructions for receiving, based at least in part on a channel metric, an indication from the base station to operate in a grant-based mode, wherein the grant-based mode supports uplink transmissions using resources assigned by a grant from the base station.

In some examples of the methods, apparatuses, and non-transitory computer-readable media described herein, the channel metric comprises a CQI backoff, a contention window metric, or a combination thereof.

Some examples of the methods, apparatuses, and non-transitory computer-readable media described herein may further include processes, features, means, or instructions for receiving, from the base station, a message that comprises a request for a measurement capability. Some examples of the methods, apparatuses, and non-transitory computer-readable media described herein may further include processes, features, means, or instructions for transmitting an additional uplink message that indicates the measurement capability in response to the request, wherein the measurement capability comprises a wireless local area network (WLAN) signal strength capability.

In some examples of the methods, apparatuses, and non-transitory computer-readable media described herein, the measurement capability comprises a measurement parameter configuration comprising a measurement frequency, a measurement dwell time, a signal strength threshold, or any combination thereof.

Some examples of the methods, apparatuses, and non-transitory computer-readable media described herein may further include processes, features, means, or instructions for periodically transmitting a result associated with the measurement to the base station.

Some examples of the methods, apparatuses, and non-transitory computer-readable media described herein may further include processes, features, means, or instructions for receiving, from the base station, a request to measure the signal of the neighboring node. Some examples of the methods, apparatuses, and non-transitory computer-readable media described herein may further include processes, features, means, or instructions for transmitting a measurement result based at least on the received request.

Some examples of the methods, apparatuses, and non-transitory computer-readable media described herein may further include processes, features, means, or instructions for receiving a measurement scheme from the base station, wherein measuring the signal from the neighboring node may be based at least in part on the measurement scheme.

In some examples of the methods, apparatuses, and non-transitory computer-readable media described herein, the neighboring node comprises at least one of a UE, a neighbor base station, an access point, or a station. In some examples of the methods, apparatuses, and non-transitory computer-readable media described herein, the neighboring node comprises a hidden node in a set of hidden nodes.

DETAILED DESCRIPTION

Figure 1:
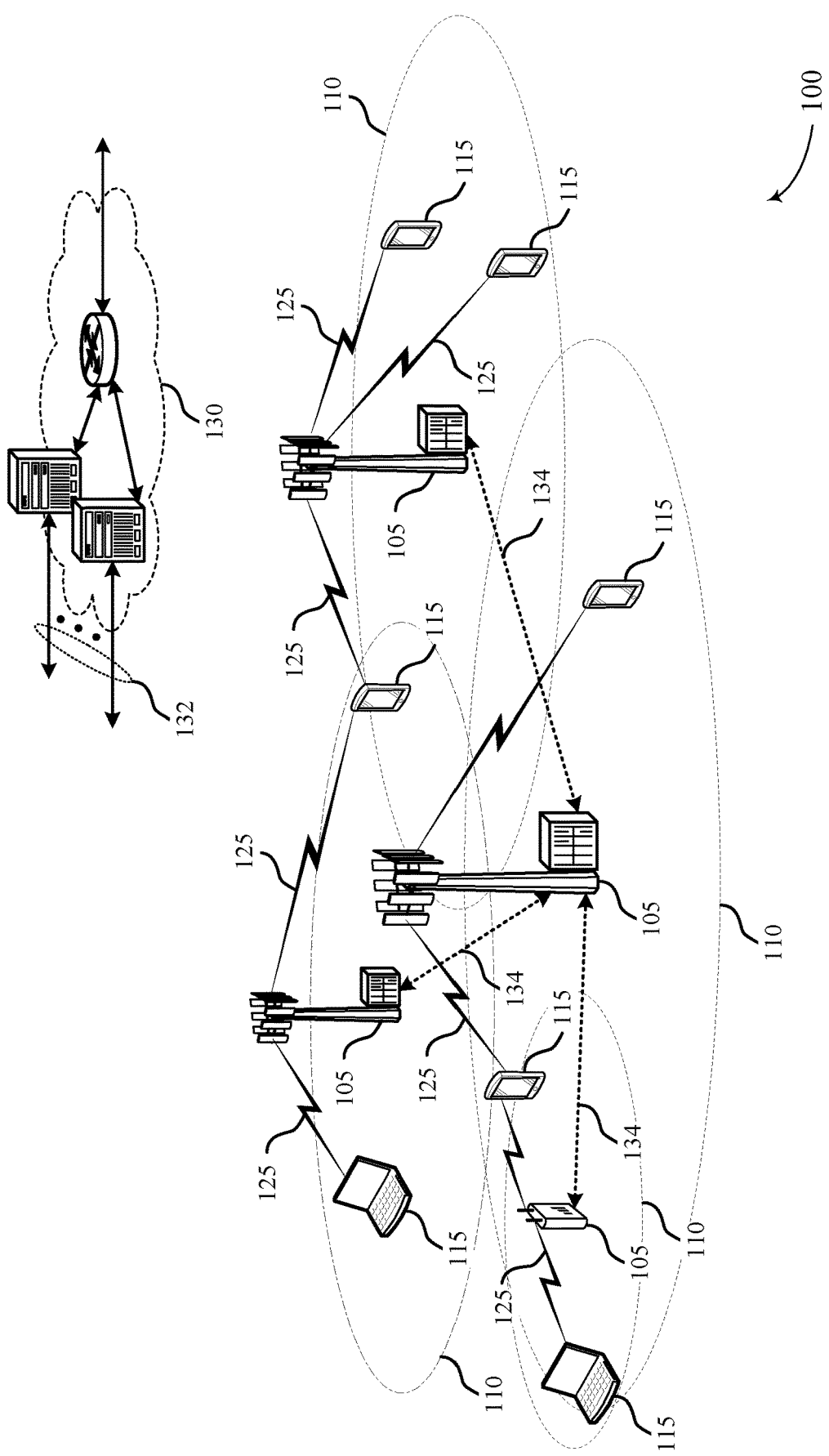
FIG. 1 illustrates an example of a wireless communication system that supports autonomous uplink channel clearance signaling in accordance with aspects of the present disclosure.

A wireless device (e.g., a UE) may benefit from operating in an autonomous (i.e., unscheduled) uplink mode in some cases and operating in a grant-based (i.e., scheduled) uplink mode in other cases, depending on various factors within a system. In an autonomous uplink mode, the UE may make unscheduled uplink transmissions in an unlicensed radio frequency spectrum band; in a grant-based mode, the UE may make uplink transmissions using resources assigned by (i.e., scheduled with) a grant from the base station. Compared to a grant-based uplink mode, an autonomous uplink mode may provide more efficient communication because of a relative reduction in overhead (e.g., control signaling) and complexity. However, in some scenarios, issues may arise when communicating according to an autonomous uplink mode. For instance, a hidden node (i.e., a node that is not detectable by the UE) may exist when the UE is communicating in an unscheduled system, and transmissions from this hidden node may result in high interference at a central base station communicating with the UE and the hidden node. Whether a UE is likely to benefit from unscheduled uplink transmissions may be a function of the number of neighboring nodes, including hidden nodes, with which the UE is contending for access to the unlicensed radio frequency spectrum band. The capability to switch between scheduled and unscheduled modes of operation may therefore allow a UE to use a particular uplink scheme that is likely to confer the most benefit.

By way of example, grant-based deployments may sometimes provide for more efficient resource utilization compared to distributed (e.g. unscheduled) wireless communication systems. However, when a scheduled uplink scheme coexists with a distributed uplink scheme, the former may suffer a disadvantage in channel access. This disadvantage may be a result of various factors, including the following triple contention scenario: first, a base station operating in a scheduled uplink system may perform a listen-before-talk (LBT) procedure before sending a grant, which may result in contention with other devices; second, uplink scheduling may cause internal contention within the base station; and third, the scheduled UE may also individually perform LBT.

To reduce complexity and overhead, while addressing the hidden node problem, a number of hidden nodes associated with a given UE may be determined. Based on the number of hidden nodes, a base station may configure the UE to operate in an autonomous uplink mode. For example, if the number of hidden nodes associated with the given UE is less than a hidden node threshold, the base station may determine that operating in an autonomous uplink mode may be beneficial.

To assist in determining the number of hidden nodes for a given UE, the UE may identify the signal strength of neighboring nodes by measuring signals from the neighboring nodes according to different measurement schemes. The measurement scheme may vary depending on the neighboring node type and additional information. In some cases, the measurement scheme may be transmitted from the base station to the UE to indicate the types of measurements to be made. Based on the measurements, the UE may transmit an indication to the base station that includes information (e.g., signal strength information) related to the neighboring nodes. The base station may also independently measure signal strength of nodes that are neighbors to the base station. By identifying a difference between the set of nodes measured by the base station and the set of nodes identified by the UE, the base station may determine whether to configure the UE to operate according to the autonomous uplink mode (e.g., via a radio resource control (RRC) message).

A UE operating according to an autonomous uplink mode may initiate a channel clearance procedure (e.g., a request-to-send/clear-to-send (RTS/CTS) handshake) with a base station in order to resolve UE ambiguity and reduce potential collisions (e.g., from hidden nodes). In such scenarios, a UE may perform a clear channel assessment (CCA) in an attempt to access the medium. Following a successful CCA procedure, the UE may transmit a busy signal (e.g., to reserve the channel) prior to initiating channel clearance signaling, such as an RTS/CTS handshake. The UE may transmit a channel clearance signal (e.g., an RTS) following the busy signal, which may prompt a base station to respond with a corresponding second channel clearance signal (e.g., a CTS). The UE may then begin transmission (e.g., physical uplink shared channel (PUSCH) transmission) upon receiving the second channel clearance signal. Such techniques may reduce intra-cell UE ambiguity and transmission collisions and may thus result in improved system performance (e.g., due to more efficient contention procedures, timing synchronization, etc.).

In some cases, a UE and base station may exchange control signaling in the channel clearance signaling. For example, base station channel clearance signaling may include a modulation and coding scheme (MCS) for an autonomous uplink mode, a transmission opportunity (TxOP) duration for an autonomous uplink mode, hybrid automatic repeat request (HARQ) information for an autonomous uplink mode, or the like. UE channel clearance signaling may also include control signaling (e.g., UE identification information). Including such control information in channel clearance signaling may reduce the overhead for subsequent control signaling (e.g., using physical uplink control channel (PUCCH) resources). In some cases, the channel clearance signaling may include preambles (e.g., Wi-Fi waveform-like signaling), in which case timing synchronization requirements (e.g., alignment of transmissions with subframe boundaries) may be relaxed. Further, the base station and UE channel clearance signaling may be power controlled to convey additional information and reduce intra-cell UE ambiguity. That is, channel clearance signaling (e.g., RTS/CTS) may be power controlled such that nearby UEs and base stations may identify themselves or neighbors as potential hidden nodes.

Aspects of the disclosure introduced above are described below in the context of a wireless communications system. Wireless systems supporting autonomous uplink channel clearance signaling in addition to example channel clearance signaling timelines are then described. Aspects of the disclosure are further illustrated by and described with reference to apparatus diagrams, system diagrams, and flowcharts that relate to autonomous uplink benefit identification and channel clearance signaling.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE/LTE-Advanced (LTE-A) network. Additionally or alternatively, wireless communications system 100 may be an example of a wireless local area network (WLAN) (e.g., a Wi-Fi network) or a MulteFire network.

The wireless communications system 100 may include multiple base stations 105, each with multiple associated UEs 115, which may represent devices such as wireless stations, mobile stations, personal digital assistant (PDAs), other handheld devices, netbooks, notebook computers, tablet computers, laptops, display devices (e.g., TVs, computer monitors, etc.), printers, etc. A UE 115 may also be referred to as a station (STA), mobile station, a subscriber station, a remote unit, a wireless device, an access terminal (AT), a handset, a user agent, a client, cellular phone, a wireless modem, a handheld device, a personal computer, a tablet, a personal electronic device, a machine type communication (MTC) device, or the like. When wireless communications system 100 is configured as a MulteFire network, the base station 105 may be configured as a MulteFire eNodeB (eNB). For example, wireless communications system 100 may include aspects of an LTE/LTE-A network, a Wi-Fi network, a MulteFire network, a neutral host small cell network, or the like, operating with overlapping coverage areas.

A MulteFire network may include base stations 105 communicating with UEs 115 in an unlicensed radio frequency spectrum band, e.g., a frequency band without a licensed anchor carrier. For example, the MulteFire network may operate without an anchor carrier in the licensed spectrum. Wireless communications system 100 may support autonomous uplink channel clearance signaling techniques which may, e.g., increase the efficiency of MulteFire communications within wireless communications system 100.

Base stations 105 (e.g., which may alternatively be referred to as access points (APs)) may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. Although a base station 105 may generally refer to aspects of wireless wide area networks (WWANs), and an AP may generally refer to aspects of WLANs, base station and AP may be used interchangeably herein. As discussed below, base stations 105 may participate in or respond to a channel clearance procedure initiated by a UE 115.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller. In some examples, base stations 105 may be macro cells, small cells, hot spots, or the like. Base stations 105 may also be referred to as eNBs 105. Base stations 105 may also be MulteFire base stations 105, which may have limited or non-ideal backhaul links 134 with other base stations 105.

In some cases, a UE 115 and base station 105 may operate in a shared or unlicensed radio frequency spectrum band. These devices may perform a CCA prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter.

In accordance with aspects of the present disclosure, a receiver that receives a packet may advantageously assess the RSSI from that packet. In general, if channel conditions between the receiver and transmitter become better, then the RSSI may increase, whereas if the channel conditions become worse, the RSSI may decrease. In some cases, the RSSI of the packet can be reported by the hardware in the status portion of the transmitter's receive descriptor. A CCA may also include detection of specific sequences (e.g., preambles) that indicate use of the channel. For example, another device may transmit a specific preamble prior to transmitting a data sequence. A CCA procedure may be used in combination with other channel clearance procedures, including an RTS/CTS procedure, as described below.

UEs 115 and base stations 105 may employ a HARQ feedback mechanism, which may be a method of ensuring that data is received correctly over a wireless communication link 125. HARQ may include a combination of error detection (e.g., using a cyclic redundancy check (CRC), forward error correction (FEC), etc.) and retransmission (e.g., automatic repeat request (ARQ)). HARQ may improve throughput at the media access control (MAC) layer in poor radio conditions (e.g., poor signal-to-noise conditions). In HARQ, incorrectly received data may be stored in a buffer and combined with subsequent transmissions to improve the overall likelihood of successfully decoding the data. In some cases, redundancy bits are added to each message prior to transmission. Additional redundancy may be useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125. In aspects of the present disclosure, control signaling related to HARQ may be exchanged in channel clearance signaling.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology in an unlicensed band such as the 5 GHz Industrial, Scientific, and Medical (ISM) band. The ISM band may also be used for other communications, such as MulteFire or Wi-Fi. When operating in unlicensed radio frequency spectrum bands, wireless devices such as base stations 105 and UEs 115 may employ LBT procedures, such as a CCA, to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD), or a combination of both.

Bidirectional communications may use FDD (e.g., using paired spectrum resources) or TDD operation (e.g., using unpaired spectrum resources). Frame structures for FDD (e.g., frame structure type 1) and TDD (e.g., frame structure type 2) may be defined. For TDD frame structures, each subframe may carry uplink or downlink traffic, and special subframes may be used to switch between downlink and uplink transmission. Allocation of uplink and downlink subframes within radio frames may be symmetric or asymmetric and may be statically determined or may be reconfigured semi-statically. Special subframes may carry downlink or uplink traffic and may include a Guard Period (GP) between downlink and uplink traffic. Switching from uplink to downlink traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported.

For example, TDD frames may include one or more special frames, and the period between special frames may determine the TDD DL-to-UL switch-point periodicity for the frame. Use of TDD offers flexible deployments without requiring paired UL-DL spectrum resources. In some TDD network deployments, interference may be caused between uplink and downlink communications (e.g., interference between uplink and downlink communication from different base stations, interference between uplink and downlink communications from base stations and UEs, etc.). For example, where different base stations 105 serve different UEs 115 within overlapping geographic coverage areas 110 according to different TDD UL-DL configurations, a UE 115 attempting to receive and decode a downlink transmission from a serving base station 105 may experience interference from uplink transmissions from other proximately located UEs 115.

In some cases, a UE 115 may be detectable by a central base station 105, but not by other UEs 115 in the coverage area 110 of the central base station 105. For example, one UE 115 may be at one end of the geographic coverage area 110 of the central base station 105 while another UE 115 may be at the other end (e.g., a hidden node). Thus, both UEs 115 may communicate with the base station 105, but may not receive (e.g., detect) the transmissions of the other. This may result in colliding transmissions for the two UEs 115 in a contention-based environment (e.g., a carrier sense multiple access with collision avoidance (CSMA/CA) system) because the UEs 115 may not refrain from transmitting on top of each other. A UE 115 whose transmissions are not detectable by another UE 115, but that is within the same geographic coverage area 110 may be known as a hidden node for the other UE 115. As described herein, CSMA/CA may be supplemented by the exchange of a RTS packet transmitted by a sending UE 115 and a CTS packet transmitted by the receiving base station 105. This may alert other devices within range of the sender and receiver not to transmit for the duration of the primary transmission. Thus, RTS/CTS may help mitigate a hidden node problem. In some examples, a UE 115 and base station 105 of interest may be referred to as a victim UE 115 or victim base station 105 when in the presence of a potentially interfering neighbor UE 115 or base station 105 (e.g., a hidden node), which may be further referred to as an aggressor UE 115 or aggressor base station 105.

In some cases, intra-cell UE ambiguity and transmission collisions may result in decreased system performance (e.g., due to timing synchronization issues). Intra-cell UE ambiguity and/or transmission collisions may arise in scenarios where two or more UEs 115 are unable to detect each other (e.g., the hidden node issue described above). In some cases, a grant may be used by a base station 105 to allocate resources to UEs 115. In autonomous uplink (e.g., grant-less uplink), the base station 105 may detect the presence of the PUSCH and identify a UE 115 through a demodulation reference signal (DMRS) or scheduling request (SR). After one autonomous uplink UE 115 successfully contends the medium, the base station may detect its PUSCH. However, since other intra-cell UEs 115 may not detect the DMRS and SR from this UE 115, another intra-cell UE 115 (e.g., an aggressor UE 115) may also successfully contend for the medium. As a result, the base station 105 may experience misaligned TDD configuration and frame start timing, which may result in a collision between the transmissions from the two UEs 115 as further described below.

As discussed above, UEs 115 operating in a shared radio frequency spectrum band may be unable to readily determine a frame structure used in the system without some indication of timing and the like. Time intervals in wireless communications system 100 may be expressed in multiples of a basic time unit (e.g., the sampling period, Ts=1/30,720,000 seconds). Time resources may be organized according to radio frames of length of 10 ms (Tf=307200 Ts), which may be identified by a system frame number (SFN) ranging from 0 to 1023.

Each frame may include ten 1-ms subframes numbered from 0 to 9; other frame structures may also be employed, as discussed below. A subframe may be further divided into two 0.5 ms slots, each of which contains 6 or 7 modulation symbol periods (depending on the length of the cyclic prefix prepended to each symbol). A resource element may consist of one symbol period and one subcarrier (e.g., a 15 kHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements.

Excluding the cyclic prefix, each symbol may contain 2048 sample periods. In some cases, the subframe may be the smallest scheduling unit, also known as a transmission time interval (TTI). In other cases, a TTI may be shorter than a subframe or may be dynamically selected (e.g., in short TTI bursts or in selected component carriers using short TTIs). A subframe may have different structures depending on the type and direction of information to be transmitted. A subframe type may be an uplink (UL) subframe, a downlink (DL) subframe, or a special (S) subframe. Special subframes may facilitate a switch from downlink to uplink transmission. Further, the structure of a subframe may vary in terms of length.

Other frame structures may also be employed in wireless communications system 100. In some cases, wireless communications system 100 may be organized by TxOPs, which may be organized according to the frame structure described above and which may be separated by periods of time during which the wireless medium may be unavailable for devices (e.g., UEs 115 or base stations 105) within wireless communications system 100.

A UE 115 may benefit from operating in an autonomous uplink mode, or the IUE 115 may benefit from operating in a grant-based uplink mode, depending on various factors within a system. That is, a UE 115 may benefit from dynamically switching between autonomous and grant-based uplink modes using techniques described herein. Whether a UE 115 is likely to benefit from unscheduled uplink transmissions may be a function of the number of neighboring nodes, including hidden nodes, with which the UE 115 is contending for access to the unlicensed radio frequency spectrum band. A base station 105 may thus select an autonomous uplink mode for the UE based on conditions determined or identified by the base station when doing so is likely to benefit the UE. In order to avoid additional interference issues or hidden node issues that may arise when a UE 115 operates in an autonomous uplink mode, the UE 115 may initiate a channel clearance scheme by transmitting a first channel clearance signal (e.g., a request-to-send message) to a base station 105. In response, the base station 105 may transmit a second channel clearance signal (e.g., a clear-to-send message) to the UE 115. After receiving the second channel clearance signal, the UE 115 may transmit an uplink message in the autonomous uplink mode, confident that uplink transmissions are likely to be received by the base station 105 and unlikely to interfere with transmissions of other UEs 115.

Figure 2:
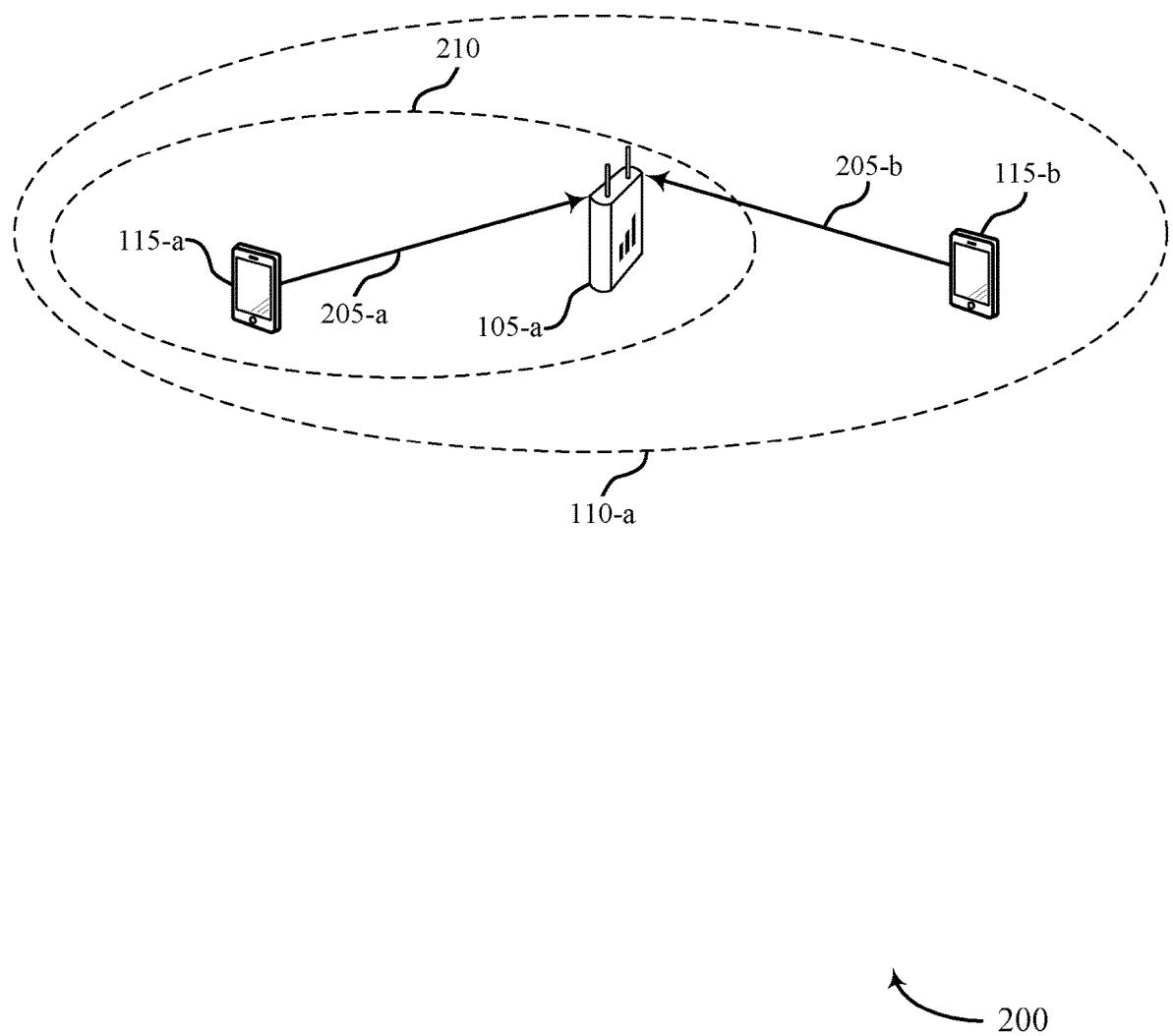
FIG. 2 illustrates an example of a wireless communication system that supports autonomous uplink channel clearance signaling in accordance with aspects of the present disclosure.

FIG. 2 illustrates an example of a wireless communications system 200 for autonomous uplink channel clearance signaling. In some examples, wireless communications system 200 may represent a system (e.g., a MulteFire system) that supports grant-based and grant-less communications coexisting in an unlicensed radio frequency spectrum band that may be shared with systems (e.g., Wi-Fi networks) employing unscheduled communications. Wireless communications system 200 may include a base station 105-a in communication with UE 115-a and UE 115-b, each of which may be an example of the corresponding devices described with reference to FIG. 1. UFs 115-a, 115-b may be contained within geographic coverage area 110-a of base station 105-a.

UFs 115-a, 115-b may attempt to transmit respective communications 205-a, 205-b to base station 105-a within a certain time range. In some cases, UE 115-a may be unable to detect communication 205-b transmitted by UE 115-b, which may result in a hidden node scenario. For example, there may be an energy detection range 210 associated with UE 115-a. Energy detection range 210 may represent a coverage area within which nearby UEs 115 (e.g., UE 115-b) and base stations 105 may detect a transmission from UE 115-a (e.g., communication 205-a). In some examples, UEs 115 and/or base stations 105 within energy detection range 210 may refrain from transmitting upon detection of communication 205-a from UE 115-a. UEs 115 outside energy detection range 210 (e.g., UE 115-b) may be unable to detect communication 205-a and therefore may transmit irrespective of potential interference issues (e.g., UE 115-b may proceed with communication 205-b), resulting in potential collisions and a decreased data rate for the wireless communications system 200.

Wireless communications system 200 may therefore employ autonomous uplink channel clearance signaling (e.g., an RTS/CTS handshake) between UE 115-a and base station 105-a in order to resolve the UE ambiguity and reduce the potential for collisions. UEs 115-a, 115-b may perform a CCA in attempt to access the medium prior to proceeding with respective communications 205-a, 205-b. Following a successful CCA procedure, the UE 115 may transmit a busy signal (e.g., to reserve the channel) prior to initiating channel clearance signaling, such as an RTS/CTS handshake.

For example, UE 115-a may successfully complete a CCA and proceed to transmit a busy signal such that UEs 115 within energy detection range 210 may postpone or cease transmission. UE 115-a may subsequently transmit a channel clearance signal (e.g., an RTS) following the busy signal, which may prompt base station 105-a to respond with a corresponding second channel clearance signal (e.g., a CTS). UE 115-a may then begin transmission of communication 205-a upon receiving the second channel clearance signal from base station 105-a, which may indicate the medium is unoccupied. In some cases, the busy signal may serve as the first channel clearance signal (e.g., serve the purpose of the RTS). That is, a busy signal may be modified to include channel clearance signaling. In other cases, the channel clearance signaling may include preambles (e.g., Wi-Fi waveform-like signaling), in which case timing synchronization requirements (e.g., alignment of subframe boundaries) may be relaxed.

Further, the base station 105-a and UE 115-a channel clearance signaling may be power controlled to convey additional information and reduce intra-cell UE ambiguity. That is, channel clearance signaling (e.g., RTS/CTS) may be power controlled such that nearby UEs 115 (e.g., UE 115-b) and base stations 105 may self-identify as potential hidden nodes. In the example of FIG. 2, base station 105-a may respond to channel clearance signaling from UE 115-a with power controlled channel clearance signaling (e.g., a power controlled CTS). The power of the channel clearance signaling transmitted by base station 105-a may be based off an energy detection threshold, a difference in RSSI between paths of communication 205-a and communication 205-b, path loss between base station 105-a and UE 115-a, a constant factor, etc. Upon reception of channel clearance signaling from base station 105-a, UE 115-a may proceed with communication 205-a. However, upon reception of channel clearance signaling from base station 105-a, UE 115-b may detect the power of the channel clearance signaling (e.g., the received power of the CTS), determine the channel clearance signaling is intended for a different UE 115-a, and refrain from transmitting communication 205-b.

As mentioned above, control signaling may also be included in the channel clearance signaling. For example, base station 105-a channel clearance signaling may include a MCS for an autonomous uplink mode, a TxOP duration for an autonomous uplink mode, HARQ information for an autonomous uplink mode, or any combination thereof. UE 115-a channel clearance signaling may also include control signaling (e.g., UE identification information). Including such control information in channel clearance signaling may reduce the need for subsequent control signaling (e.g., using PUCCH resources). In some examples, UE channel clearance signaling may contain identification information specific to the transmitting UE 115-a (e.g., a UE identifier). Further, aspects of communication 205 (e.g., frame start timing and subframe configuration) may be specified by the UE 115-a (e.g., via channel clearance signaling) or may be specified by base station 105-a (e.g., via RRC signaling, channel clearance signaling, etc.).

Figure 3A:
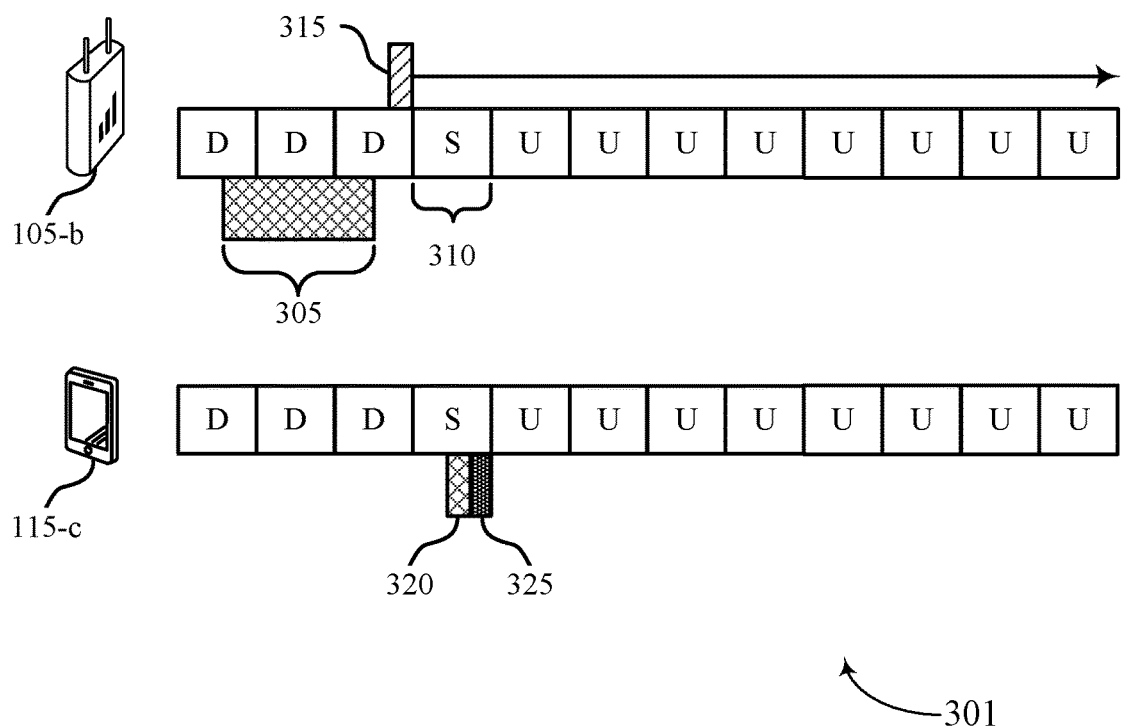
FIGS. 3A and 3B illustrate examples of contention procedure timelines that may support autonomous uplink channel clearance signaling in accordance with aspects of the present disclosure.

FIG. 3A illustrates an example of a timeline 301 for grant-based uplink channel clearance signaling in accordance with one or more aspects of the present disclosure. Timeline 301 includes UE 115-c and base station 105-b, which may be examples of or may represent aspects of techniques performed by a UE 115 or a base station 105 as described with reference to FIGS. 1 and 2. In FIG. 3A, base station 105-b is in communication with UE 115-c. Timeline 301 illustrates the time domain segmentation of a given frequency range (e.g., such that the illustrated timelines for UE 115-c and base station 105-b may be associated with the same frequency resources). Accordingly, timeline 301 is duplicated and illustrated next to base station 105-b and UE 115-c for the sake of explanation (e.g., to illustrate aspects of the transmission schemes associated with the respective wireless devices). Further, aspects of the following examples are explained in the context of a TDD system. However, it is to be understood that aspects of these techniques may additionally apply to FDD communications (e.g., such that the duplicated timeline 301 next to base station 105-b and UE 115-c may in some cases be associated with different frequency resources).

According to timeline 301, base station 105-b may initiate a CCA procedure 305 to determine whether the channel is available for communication. Once it is determined that the channel is available, base station 105-b may then transmit a preamble 315, which may include a reservation signal (e.g., CTS message) to reserve the medium for uplink transmission. For example, preamble 315 may indicate to UE 115-c that the medium is reserved for a given TxOP. In the example depicted in FIG. 3A, the TxOP includes a 1-ms special subframe followed by 8 ms (i.e., 8 consecutive 1 ms subframes), but other durations may also be employed. Based on the preamble 315, UE 115-c may also initiate its own CCA procedure at 320, and may transmit a busy signal 325 indicating that the channel is reserved. This process may occur during special subframe 310.

Generally, in a grant-based uplink system, neighboring UEs 115 may remain silent when UE 115-c is transmitting. This silence occurs because neighboring UEs 115 may be within an energy detection range or preamble detection range of the base station 105-b. Base station 105-b may send a preamble transmission (e.g., preamble 315) and an uplink grant to the UE 115-c. Neighboring UEs 115 may hear the preamble and defer transmission (e.g., for an amount of time indicated in the preamble). Thus, when the UE 115-c sends its uplink transmission to base station 105-b, neighboring UEs 115 may remain silent (e.g., may not attempt to access the channel).

Figure 3B:
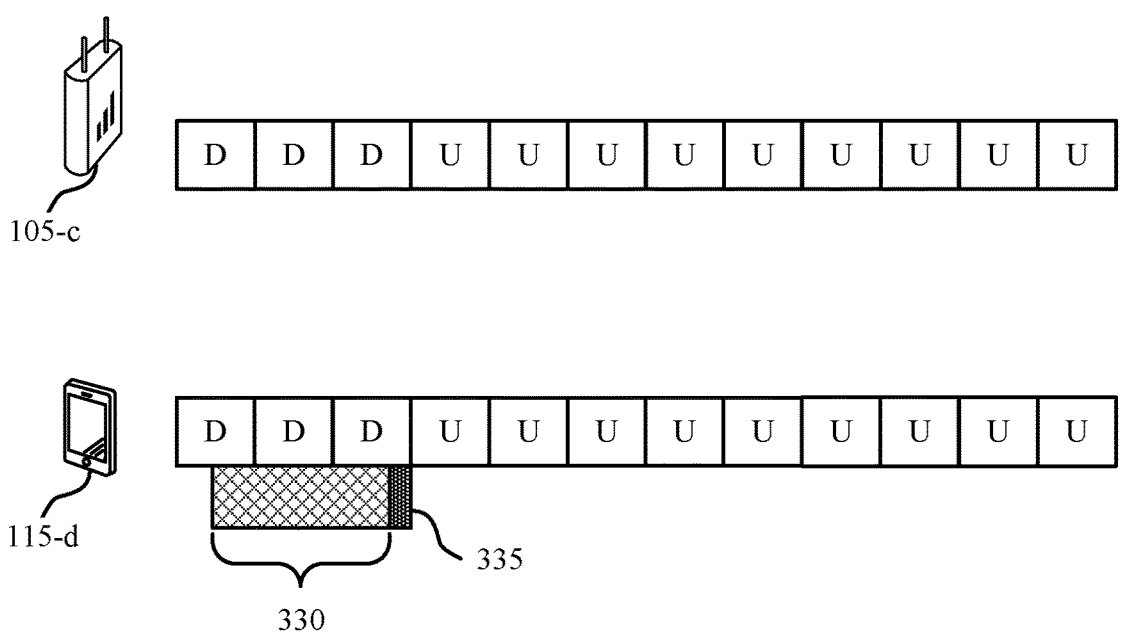

FIG. 3B illustrates an example of a timeline 302 for autonomous uplink channel clearance signaling in accordance with various aspects of the present disclosure. Timeline 302 may include operations of UE 115-d and base station 105-c, which may be examples of or may represent aspects of techniques performed by a UE 115 or a base station 105 as described with reference to FIGS. 1 and 2. Unlike the timeline 301 for grant-based communication, in timeline 302 for autonomous uplink mode communication, base station 105-c may not initiate a CCA or transmit a preamble. As a result, there may be no need for allocating a subframe as a special subframe, as UE 115-d may not perform preamble detection and decoding. This may allow an additional subframe to be allocated for uplink transmission, as shown. According to timeline 302, UE 115-d may initiate a CCA procedure 330 to determine whether the channel is available for communication. If it is determined that the channel is available, the UE 115-d may transmit a busy signal 335, which may be a burst of energy, indicating that the channel is reserved for communication. Based on successfully performing the CCA procedure 330, UE 115-d may initiate an uplink transmission without requiring base station 105-c to initiate its own CCA or transmit a preamble indicating that the UE 115-d has been granted access to the channel.

As discussed above, operating in an autonomous uplink mode may result in strong interference experienced at a base station 105-c in a hidden node scenario. Therefore, in some examples, techniques for channel clearance signaling may be employed to provide for more efficient communication between a base station 105-c and a UE 115-d.

Figure 4:
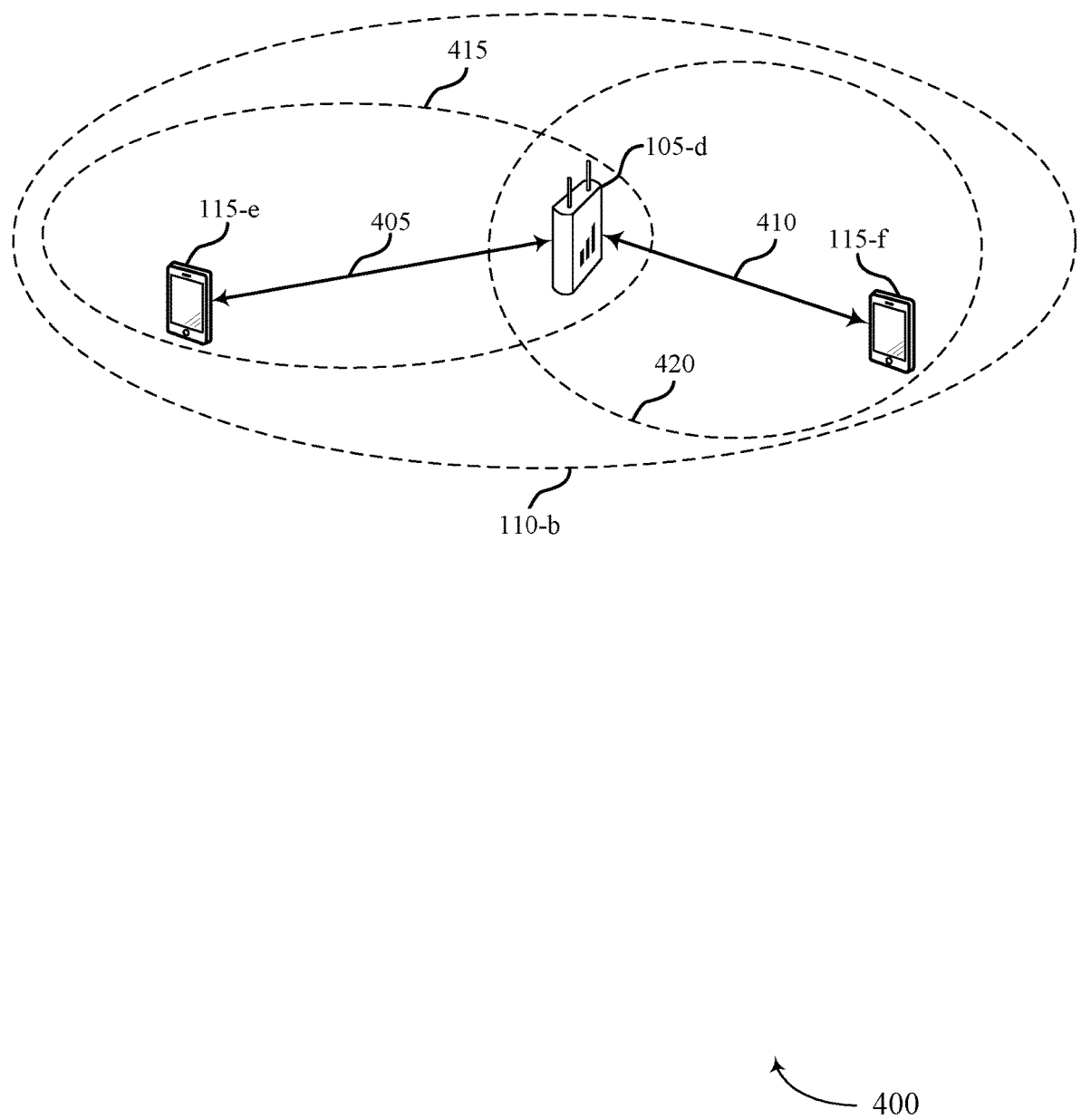
FIG. 4 illustrates an example of a wireless communication system that supports autonomous uplink channel clearance signaling in accordance with aspects of the present disclosure.

FIG. 4 illustrates an example of a wireless communication system 400 for autonomous uplink channel benefit identification and clearance signaling. Wireless communication system 400 includes base station 105-d, UE 115-e, and UE 115-f, which may be examples of the corresponding devices described with reference to FIGS. 1 and 2. As shown, base station 105-d is capable of communicating with UE 115-e within its geographic coverage area 110-b over communication link 405. Base station 105-d is also capable of communicating with UE 115-f over communication link 410.

When operating in a grant-based mode, UE 115-f, a neighboring node with respect to UE 115-e, will remain silent when UE 115-e is communicating with base station 105-d. For example, grant-based communication may occur when neighbor UE 115-f is within a preamble detection range 420 of base station 105-d, and is therefore capable of receiving a preamble of a message transmitted by base station 105-d to UE 115-e over communication link 405. For example, UE 115-e and UE 115-f may each contend for access to a medium of wireless communication system 400 by sending separate requests to the base station 105-d. The requests may contain information related to the respective UEs 115 (e.g., a UE identifier) or the data to be communicated (e.g., the data size or transmission duration based on a given MCS). The base station 105-d may grant access to UE 115-e by sending an uplink (UL) grant to the UE 115-e. Neighbor UE 115-f may receive the preamble of the UL grant, determine that UE 115-e has gained access to the medium, and defer transmitting during a TxOP duration (e.g., which may be obtained by decoding the preamble) allocated to UE 115-e. Thus, when the UE 115-e transmits a message over communication link 405 to base station 105-d, neighbor UE 115-f may remain silent and elect not to transmit over communication link 410.

If wireless communication system 400 is operating in an autonomous uplink mode (e.g., a grant-less mode), communication issues may arise when a neighbor UE 115-f is a hidden node. For example, a base station 105-d may be located closer to neighbor UE 115-f than UE 115-e, and neighbor UE 115-f may be outside of an energy detection range 415 associated with UE 115-e. When operating in an autonomous uplink mode, UE 115-e may initiate its UL transmission over communication link 405 without receiving a grant from the base station 105-d. However, as a result of being located outside of the energy detection range 415, neighbor UE 115-f may not be able to detect the transmission over communication link 405 and may therefore initiate its own UL transmission over communication link 410. The two messages (i.e., one from each of UEs 115-e and 115-f, over the same channel at approximately the same time) may interfere with each other at base station 105-d. Thus, to more efficiently communicate when operating according to an autonomous uplink mode, a base station 105-d may determine whether a number of hidden nodes are associated with a given UE 115-e. Based on the number of hidden nodes, UE 115-e and a base station 105-d may be configured to communicate according to an autonomous uplink mode and may employ additional channel clearance techniques as described herein.

In order to determine whether neighboring nodes are hidden nodes, UE 115-e may identify or measure the signal strength of neighboring nodes (e.g., UE 115-f). Depending on the type of node, measurements may be taken in different ways. For example, measurements may be made through Wi-Fi beacons or DMRS for a neighbor node that is an AP or a base station, respectively. Measurements may be made through ACK/NACK RSSI measurements or LTE-Direct (LTE-D) discovery signals for a neighbor node that is a STA or a UE, respectively. Other measurement are considered without departing from the scope of the present disclosure.

UE 115-e may measure neighboring nodes based on a measurement scheme. The measurement scheme may be transmitted to the UE 115-e (e.g., from base station 105-d) and may indicate what types of neighboring nodes should be measured. The measurement scheme may also include information relating to the report type (e.g., triggered or periodic) when reporting the measurements back to the base station 105-d. For example, any combination of measurements made for a neighboring AP, STA, UE 115, or base station 105, may be indicated in the measurement scheme. In some examples, UE 115-e may identify or measure only one type of neighboring node and in other cases, the UIE may identify or measure several or all types of neighboring nodes. The measurement scheme may be indicated to the UE 115-e through RRC signaling, for example.

TABLE 1

| Neighbor Type | Signal to Measure |
|---|---|
| AP | Wi-Fi Beacon |
| Base Station | DRS |
| STA | STA ACK RSSI or 802.11k STA measurements |
| UE | LTE-D discovery signal |

Table 1 illustrates exemplary neighboring node types and associated signals to measure. In Table 1, depending on whether the neighbor is an AP, a base station, a STA, or a UE, different signals may be used to obtain measurements for the neighbor. For instance, if the neighboring node is an AP, the Wi-Fi beacon transmitted by the AP may be used to obtain measurements for signal strength. If the neighboring node is a base station, the DRS transmitted by the base station may be use to obtain measurements for signal strength.

The measurement schemes may in some cases be divided into six (6) schemes: scheme 1: measure base stations, APs, STAs, and UEs; scheme 2: measure base stations, APs, and STAs; scheme 3: measure base stations and APs; scheme 4: measure base stations only; scheme 5: measure base stations including aided information; and scheme 6: measure aided information only. In these schemes, it is to be understood that aided information may be used to refer to the channel metrics discussed below (e.g., channel quality indicator (CQI) backoff, contention window size, etc.). Any or all such measurement schemes may be configured through RRC signaling.

In some examples, base station 105-d may request a measurement capability of UE 115-e using a capability check request. For instance, base station 105-d may transmit a capability check request to determine whether UE 115-e is capable of measuring one or more measurement parameters (e.g., frequency, scan type (e.g., active/passive), scan dwell time, or RSSI threshold). The capability check request may include a request for an indication of whether UE 115-e is capable of measuring one or more signals (e.g., signals from a Wi-Fi AP or signals from a Wi-Fi STA). The request may also indicate the reporting type, such as whether UE 115-e should report measurements periodically or based on a trigger.

Based on the identified or measured signal strength for neighboring nodes, UE 115-*c* may determine that a neighboring node (e.g., UE 115-*f*) is a hidden node. For example, the measured signal strength(s) may be compared to a threshold value (i.e., an energy detection (ED) threshold or a preamble detection (PD) threshold). In some cases, measured RSSI between various devices may be used to indicate whether a neighbor node is a hidden node. For instance, because the location or configuration of a neighboring node may affect the measured signal strength, neighbor UE 115-*f* may not hear UE 115-*e* when UE 115-*e* initiates an UL transmission. In another example, UE 115-*e* may be capable of measuring a signal strength from a neighbor UE 115-*f*, but may not backoff in an autonomous uplink system (e.g., due to the measured signal strength being below a threshold). In such cases, UE 115-*e* may initiate its own UL transmission.

In some examples, base station 105-*d* may determine to configure operations with UE 115-*e* according to an autonomous uplink mode. In such examples, UE 115-*e* may measure signal strength from one or more nearby neighbors, such as UE 115-*f*. UE 115-*e* may then transmit a hidden node indication to base station 105-*d*. The hidden node indication may be based on, for example, the measured signal strength of one or more neighboring nodes, as discussed above. The hidden node indication may also include a set of nodes that may be potential hidden nodes with respect to UE 115-*e*.

After receiving the hidden node indication, the base station 105-*d* may also measure nearby neighboring nodes according to the measurement scheme. This measurement may include identifying signal strength from a neighboring node. Based on these measurements and the information contained in the hidden node indication, base station 105-*d* may identify a number of hidden nodes associated with UE 115-*e*. To do so, base station 105-*d* may identify a difference between the set of neighboring nodes contained in the hidden node indication and a set of neighboring nodes determined by the base station 105-*d*. If, for example, a neighboring node is within the set of neighboring nodes measured by the base station, but is not within the set of neighboring nodes indicated by the hidden node indication, the neighboring node may be identified as a hidden node. Thus, using this technique, the base station 105-*d* may determine a number of hidden nodes associated with UE 115-*e*.

To determine whether to configure UE 115-*e* to operate in an autonomous uplink mode, the base station 105-*d* may determine the number of hidden nodes associated with UE 115-*e*, as discussed above. If the number of nodes is below a given threshold, the base station 105-*d* may select an autonomous uplink mode for communication with UE 115-*e*. In such cases, the base station 105-*d* may transmit an indication of the autonomous uplink mode to UE 115-*e*. This indication may be transmitted in a RRC message, for example. The UE 115-*e* may then configure itself to operate in the autonomous uplink mode and transmit an uplink message to the base station 105-*d* over an unlicensed spectrum according to the autonomous uplink mode. UE 115-*e* may also employ channel clearance procedures to increase the efficiency of autonomous operation with respect to uplink transmissions to base station 105-*d*.

Alternatively, if the number of nodes is above the given threshold, base station 105-*d* may select a grant-based mode for communication with UE 115-*e*. That is, base station 105-*d* may identify that a number of hidden nodes for UE 115-*e* is greater than the threshold such that autonomous uplink communications from UE 115-*e* may suffer decreased throughput (e.g., relative to grant-based communications).

Additionally or alternatively, base station 105-*d* may mitigate interference between the hidden nodes and UE 115-*e* to improve conditions for autonomous uplink operation. As an example, base station 105-*d* may trigger a handover event for one or more of the hidden nodes. Other interference mitigation techniques are considered. For example, base station 105-*d* may signal one of more of the hidden nodes to adjust its transmission power such that these nodes no longer represent hidden nodes for UE 115-*e*. In aspects, base station 105-*d* may thus configure UE 115-*e* (e.g., via RRC signaling) to operate in a grant-based uplink mode or in an autonomous uplink mode based at least in part on a number of hidden nodes associated with UE 115-*e*.

In some examples, base station 105-*d* may determine to communicate with UE 115-*e* according to an autonomous uplink mode by using information such as a channel metric (e.g., CQI backoff, contention window size, etc.). For example, base station 105-*d* may determine that a number of hidden nodes for UE 115-*e* is below a certain threshold by identifying a CQI backoff metric for UE 115-*e*. If the CQI backoff metric is below a certain threshold, base station 105-*d* may determine to communicate with UE 115-*e* in an autonomous uplink mode. Alternatively, base station 105-*d* may determine that the CQI backoff metric is above a certain threshold. In such cases, the base station 105-*d* may communicate with UE 115-*e* according to a grant based mode.

In some examples, base station 105-*d* may maintain a channel metric histogram over time for one or more UEs 115. For example, base station 105-*d* may maintain a CQI backoff histogram for UE 115-*e*. The CQI backoff histogram may be determined based at least in part on uplink ACK/NACK feedback from UE 115-*e*. Based on the CQI backoff histogram, the base station 105-*d* may configure UE 115-*e* to operate according to a grant based mode or in an autonomous uplink mode. In some examples, base station 105-*d* may semi-statically configure UE 115-*e* to operate in an autonomous uplink mode (e.g., through RRC configuration or reconfiguration).

Figure 5A:
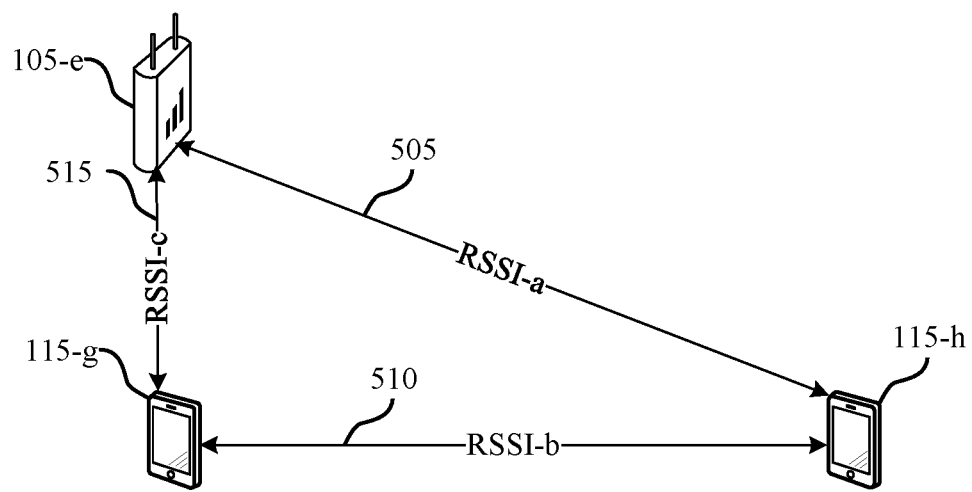
FIGS. 5A and 5B illustrate example aspects of wireless communication systems that support autonomous uplink channel clearance signaling in accordance with aspects of the present disclosure.
Figure 5B:
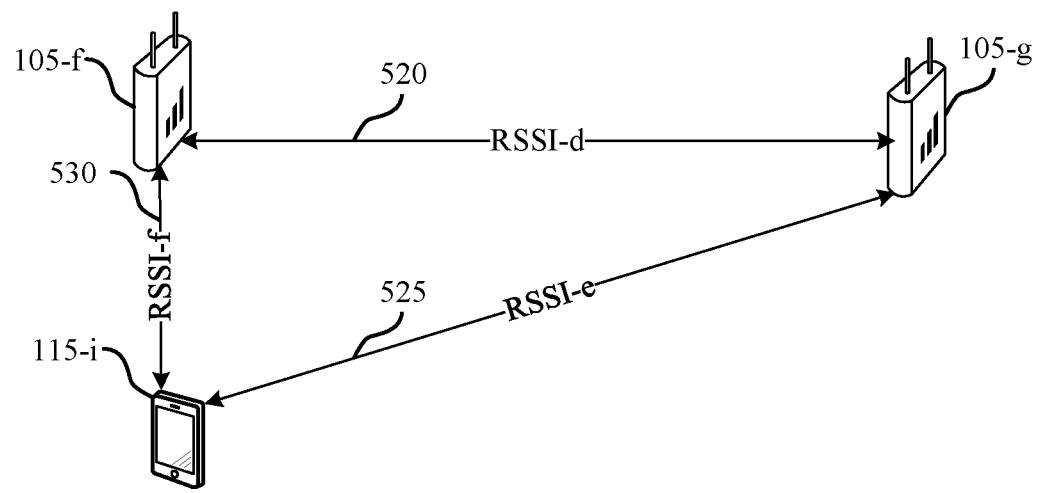

FIGS. 5A and 5B illustrate example measurement configurations that support autonomous uplink mode benefit identification and operation in accordance with various aspects of the present disclosure. Wireless communication system 501 of FIG. 5A may include UEs 115-*g*, 115-*h* and base station 105-*e*, which may be examples of the corresponding devices described with reference to FIGS. 1 through 4.

In some examples, UE 115-*g* may determine whether a neighbor UE 115-*h* is a hidden node. The hidden node determination may be accomplished by a comparison of the RSSI between various devices. For example, UE 115-*g* may measure RSSI-b 510 of a detected transmission from UE 115-*h*. If the measured RSSI-b 510 is less than some ED threshold, then neighbor UE 115-*h* may represent a potential hidden node. That is, neighbor UE 115-*h* and UE 115-*g* may be located or configured with respect to base station 105-*e* as discussed with reference to FIG. 4. In such cases, neighbor UE 115-*h* may not hear (e.g., detect) uplink transmissions from UE 115-*g* and may not backoff, resulting in potential interference. That is, UE 115-*g* may determine that measured RSSI-b 510 is less than some threshold, such that neighbor UE 115-*h* may not backoff (e.g., when UE 115-*g* initiates an uplink transmission). This determination may indicate that neighbor UE 115-*h* is a potential hidden node, and that the base station 105-*e* should engage in a grant-based system, instead of an autonomous uplink mode with respect to communications with UE 115-*g*. However, comparing RSSI information between a UE 115-*g* and a neighbor UE **115-*h* (e.g., RSSI-b 510) may be difficult. In some cases, the ED threshold may depend upon the node type (e.g., whether UE 115-*h* is a STA or a UE 115**). For example, if the node is a UE in an LTE system, then the ED threshold may be equal to −72 dBm. In another example, if the node is a STA in a Wi-Fi system, then the ED threshold may be equal to −62 dBm. Other threshold values are possible within the scope of the present disclosure.

In other examples, base station **105-*e* may measure the RSSI-a 505 of the neighbor UE 115-*h*. If the measured RSSI-a 505 is less than some PD threshold, then neighbor UE 115-*h* may not backoff in an autonomous uplink system. That is, neighbor UE 115-*h* may not be capable of receiving a preamble message used to indicate reservation of a medium. For example, base station 105-*e* may transmit a preamble message to reserve a medium for UE 115-*g*. This preamble message may not be successfully heard and/or decoded by UE 115-*h* as the measured RSSI-a 505 may be below a given PD threshold. Thus, by measuring RSSI-a 505, base station 105-*e* may determine that neighbor UE 115-*h* represents a potential hidden node and may configure communications with UEs 115-*g*, 115-*h*** accordingly.

In still other examples, base station **105-*e* may determine a difference between RSSI-a 505 and RSSI-c 515. A difference that is less than or equal to some threshold, may indicate a signal-to-interference-plus-noise ratio (SINR) change at base station 105-*e*. The value of this threshold may depend on the type of neighbor node. For example, the neighbor might be a UE or a Wi-Fi STA. If the difference between RSSI-a 505 and RSSI-c 515 at base station 105-*e* is above a certain threshold, then the signal strength of UE 115-*g* may be strong enough such that neighbor UE 115-*h* may detect a transmission from UE 115-*g* and backoff. However, if the measured difference is below a certain threshold, then the SINR degradation may become so great as to limit the ability of neighbor UE 115-*h* to detect the transmission from UE 115-*g*. Thus, neighbor UE 115-*h* may not backoff in an autonomous uplink system. This determination may indicate that neighbor UE 115-*h* is a potential hidden node, and that the base station 105-*e* should engage in a grant-based system, instead of an autonomous uplink mode, with respect to UE 115-*g***.

Further, FIG. 5A may illustrate techniques for identifying potential hidden nodes in a distributive fashion. For example, UE **115-*g* may complete a CCA and may subsequently transmit an RTS signal to base station 105-*e*, which may prompt base station 105-*e* to transmit a CTS signal. Based on the RTS signal, base station 105-*e* may determine a measure of the channel between itself and UE 115-*g*. In some examples, the measure of the channel may be a path loss (PL) value. In other examples, the measure of the channel may be an RSSI value (e.g., RSSI-c 515**).

By way of example, base station **105-*e* may broadcast a CTS with a special transmission power to allow neighboring UEs (e.g., UE 115-*h*) to estimate a signal strength metric (e.g., PL, RSSI, etc.) for the channel between base station 105-*e* and UE 115-*g*. The CTS transmission power may be based at least partially on an ED threshold for base station 105-*e*, a threshold of the difference in RSSIs between the base station 105-*e* and various UEs (e.g., UE 115-*g* and UE 115-*h*) that allows the base station 105-*e* to distinguish overlapping transmissions (e.g., "RSSI threshold"), and a signal strength metric for the channel (e.g., a PL) between base station 105-*e* and UE 115-*g***. As an example, the transmission power may be computed as, $$P_{CTS} [dB] = ED + Th - PL(s) + C \quad (1)$$

where $P_{CTS}$ represents the transmitted signal power, ED is an energy detection threshold associated with base station **105-*e*, Th is an RSSI threshold (e.g., an allowable difference between RSSI-c 515 and RSSI-a 505), PL(s) is a pathloss along the channel between base station 105-*e* and UE 115-*g***, and C is a constant. The equation above and those that follow are exemplary; other implementations are also contemplated. Thus, the equations themselves may be modified without affecting the scope of the inventive concept.

In some embodiments, the ED threshold (ED) as well as the RSSI threshold (Th) may be known by all UEs 115 within the cell (e.g., UE **115-*g*, UE 115-*h*, etc.). A potential hidden node (e.g., UE 115-*h*) may receive the CTS signal sent from base station 105-*e* at the special transmission power ($P_{CTS}$). The received power at the neighbor UE (e.g., UE 115-*h*) may depend at least partly on the special transmission power and some metric (e.g., a PL or RSSI-a 505) associated with the channel between the base station 105-*e* and UE 115-*h***, such as, $$P_{NEIGHBOR} [dB] = P_{CTS} - PL(APAT) \quad (2)$$

where $P_{NEIGHBOR}$ is the received power (e.g., at UE **115-*h*) and PL(APAT) is the PL along the channel between UE 115-*h* and base station 105-*e***.

A neighbor UE (e.g., UE **115-*h*) may use other known information (e.g., the ED threshold, the RSSI threshold, and some metric (e.g., a PL value) associated with a channel between itself and base station 105-*e*) to estimate a difference between its channel and the channel between UE 115-*g* and base station 105-*e*** (ΔRSSI), as $$P_{NEIGHBOR} [dB] = ED + Th - PL(s) - PL(APAT) \quad (3)$$

$$P_{NEIGHBOR} [dB] = ED + Th - \Delta RSSI \quad (4)$$

Based on the value of Δ RSSI, a neighbor UE (e.g., UE **115-*h***) may determine whether or not a potential hidden node scenario exists and elect to backoff or transmit accordingly. Specifically, if $$P_{NEIGHBOR} \geq ED \quad (5)$$

then, $$\Delta RSSI \leq Th \quad (6)$$

In this example UE **115-*h* may decide to backoff and refrain from transmitting because the Δ RSSI is below some pre-specified threshold, meaning that the aggressor UE (e.g., UE 115-*h*) represents a hidden node for victim UE 115-*g***. Such techniques allow for identification of potential hidden nodes in a distributive fashion.

In other examples, a CTS signal may be utilized to carry some control signaling information. Such signaling information may include a new TDD configuration to be used by UE **115-*g* for autonomous uplink transmission. This type of signal (e.g., 3 bits) may eliminate the ambiguity with remaining intra-cell UEs (e.g., UE 115-*h*) as discussed below with reference to FIG. 6. In another embodiment, the signaling information (e.g., 5 bits) may contain a MCS to be used in autonomous uplink transmission. In another embodiment, the signaling information (e.g., 2-3 bits) may contain an uplink TxOP duration. Additionally, the signaling information may contain uplink HARQ information. The payload size of the uplink HARQ information of an upcoming autonomous uplink TxOP may be reduced based on a HARQ process limitation in consecutive subframes of an autonomous uplink TxOP. As an example, UE 115-*g* may transmit certain UE-specific information in the first subframe of a uplink TxOP and allow base station 105-*c*** to derive this information in subsequent subframes. Incorporating this signaling information into a CTS signal may reduce PUCCH resources required for the communication session between, e.g., UE 115-g and base station 105-e.

In FIG. 5B, wireless communication system 502 includes a UE 115-i and base stations 105-f, 105-g, which may be examples of or may represent aspects of techniques performed by a UE 115 or a base station 105 as described with reference to FIGS. 1 through 4. In some examples, a UE 115-i may determine whether a neighbor base station 105-f is a hidden node. This may involve determining a RSSI associated with one or more devices in wireless communication system 502. For example, UE 115-i may measure the RSSI-e 525, which may include measuring a signal (e.g., a WiFi beacon or a DMRS) from base station 105-g. The UE 115-i may then compare the measured RSSI-e 525 to a given ED threshold, which may depend upon the neighbor node type. For example, if the node is a base station in an LTE system, then the ED threshold may be equal to −72 dBm. In another example, if the node is an AP in a WiFi system, then the ED threshold may be equal to −62 dBm.

If the measured RSSI is below the ED threshold, UE 115-i may determine that neighbor base station 105-g may not backoff from communication. That is, neighbor base station 105-g may not hear UE 115-i when it initiates a UL transmission or base station 105-g may hear the transmission from UE 115-i but may determine that because the transmission energy is below a given threshold, the base station 105-g is able to transmit on top of the transmission from UE 115-i. In such cases, because neighbor base station 105-g may not backoff, UE 115-i may determine that neighbor base station 105-g is a potential hidden node.

In some examples, base station 105-f may measure the RSSI-d 520 of neighbor base station 105-g. If the measured RSSI-d 520 is less than a given PD threshold, base station 105-f may determine that neighbor base station 105-g may not backoff communication. That is, neighbor base station 105-g may not be capable of receiving a preamble message used to indicate reservation of a medium. For example, base station 105-f may transmit a preamble message to reserve a medium for UE 115-i. This preamble message may not be successfully heard and/or decoded by base station 105-g as the measured RSSI-d 520 may be below a given PD threshold. In such instances, neighbor base station 105-g may not backoff in an autonomous uplink system, and base station 105-f may determine that neighbor base station 105-g is a hidden node.

In some cases, base station 105-f may determine a difference between RSSI-d 520 and RSSI-f 530. A difference that is less than or equal to given RSSI difference threshold may indicate a SINR change at base station 105-f. The value of the RSSI threshold may depend on the type of neighbor node. For example, the neighbor base station 105-g may be a base station or a WiFi AP and if the difference between RSSI-d 520 and RSSI-f 530 is above a RSSI difference threshold, it may be determined that the signal strength of UE 115-i is strong enough that neighbor base station 105-g will be able to hear a transmission from UE 115-i and backoff. If the measured difference is below an RSSI difference threshold, the SINR degradation may limit the ability of neighbor base station 105-g to hear a transmission from UE 115-i. Thus, neighbor base station 105-g may not backoff. In such cases, base station 105-f may then determine that neighbor base station 105-g is a hidden node.

Figure 6:
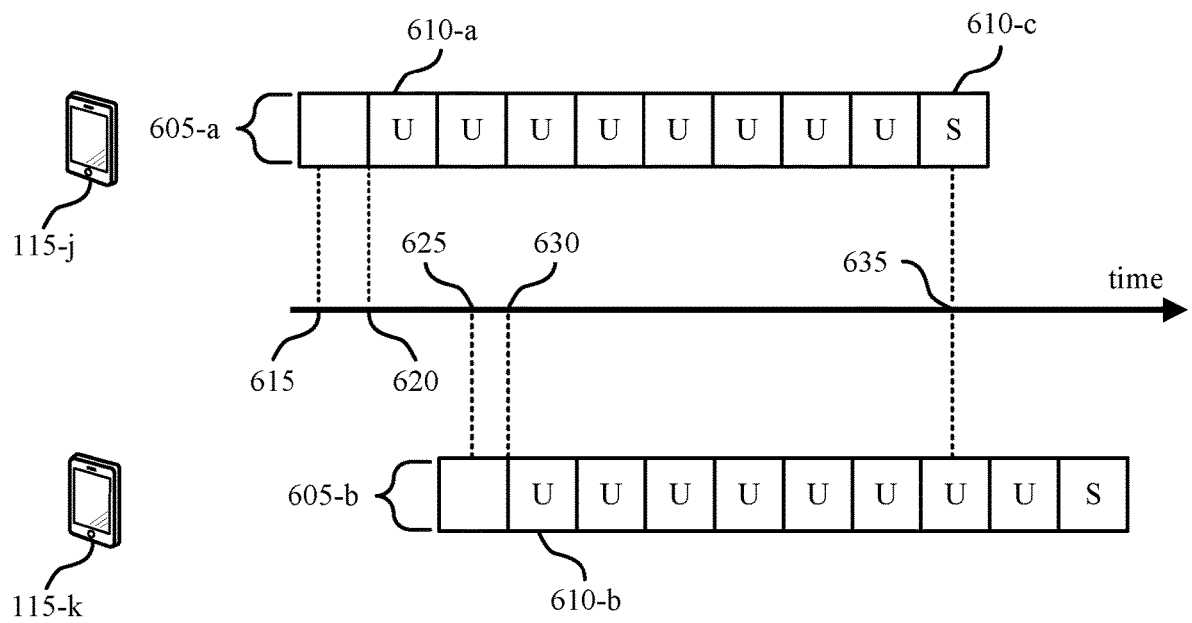
FIGS. 6 and 7 illustrate examples of contention procedure timelines that support autonomous uplink channel clearance signaling in accordance with aspects of the present disclosure.

FIG. 6 illustrates an example of a timeline 600 that supports autonomous uplink channel clearance signaling. In the example depicted in FIG. 6, timeline 600 demonstrates a scenario associated with intra-cell UE ambiguity and potential transmission collisions of transmissions according to TDD configurations 605 in an unscheduled wireless communication system (e.g., a system employing grant-less communications). Example timeline 600 may include reference to UE 115-j and UE 115-k, which may be examples of UEs 115 described above (e.g., with respect to FIG. 1).

TDD configuration 605-a may correspond to a transmission associated with UE 115-j while TDD configuration 605-b may correspond to a transmission associated with UE 115-k, where the timing of such transmissions are illustrated along example timeline 600. In some examples, the subframe formats or frame-start timings of the TDD configurations 605 (e.g., for unscheduled transmission) may be independently configured for the UEs 115 (e.g., UE 115-j and UE 115-k may be configured with TDD configuration 605-a and TDD configuration 605-b, respectively). TDD configurations 605 may include a number of subframes 610 (e.g., 10 subframes in the example of FIG. 6). Subframes 610 may be configured as uplink subframes, downlink subframes, or special subframes as discussed above with reference to FIG. 1.

In some examples, UE 115-j may successfully complete a CCA at time 615 following a contention window. Subsequently, UE 115-j may begin transmission during uplink subframe 610-a at time 620 using, for example, PUSCH resources. A base station 105 may detect the presence of UE 115-j based on the presence of the transmitted PUSCH. Additionally, the base station 105 may identify UE 115-j through a UE-specific DMRS, which may be assigned through RRC. In another example, base station 105 may detect and identify UE 115-j through a SR, which may be sent over PUCCH.

However, UE 115-k (e.g., a neighbor or aggressor UE 115 associated with the same base station 105) may not detect the DMRS or SR from UE 115-j, and thus may also successfully complete a CCA, for instance at time 625. Accordingly, UE 115-k may then begin transmission during subframe 610-b at time 630. As a result, configuration 605-a and configuration 605-b may be misaligned in time, which may cause base station 105 to misunderstand the TDD configuration and frame-start timing. In the present example, TDD configuration 605-a has a special subframe configured for subframe 610-c and TDD configuration 605-b may have an uplink subframe configured for subframe 610-c due to timing misalignment arising from UE 115-j and UE 115-k contention procedures. That is, at time 630, base station 105 may not anticipate transmissions in subframe 610-c, which may result in collisions and degraded data rates. According to the techniques described above, UE 115-j and UE 115-k may employ channel clearance signaling with a base station 105 for enhanced timing synchronization and alignment of subframe boundaries.

Figure 7:
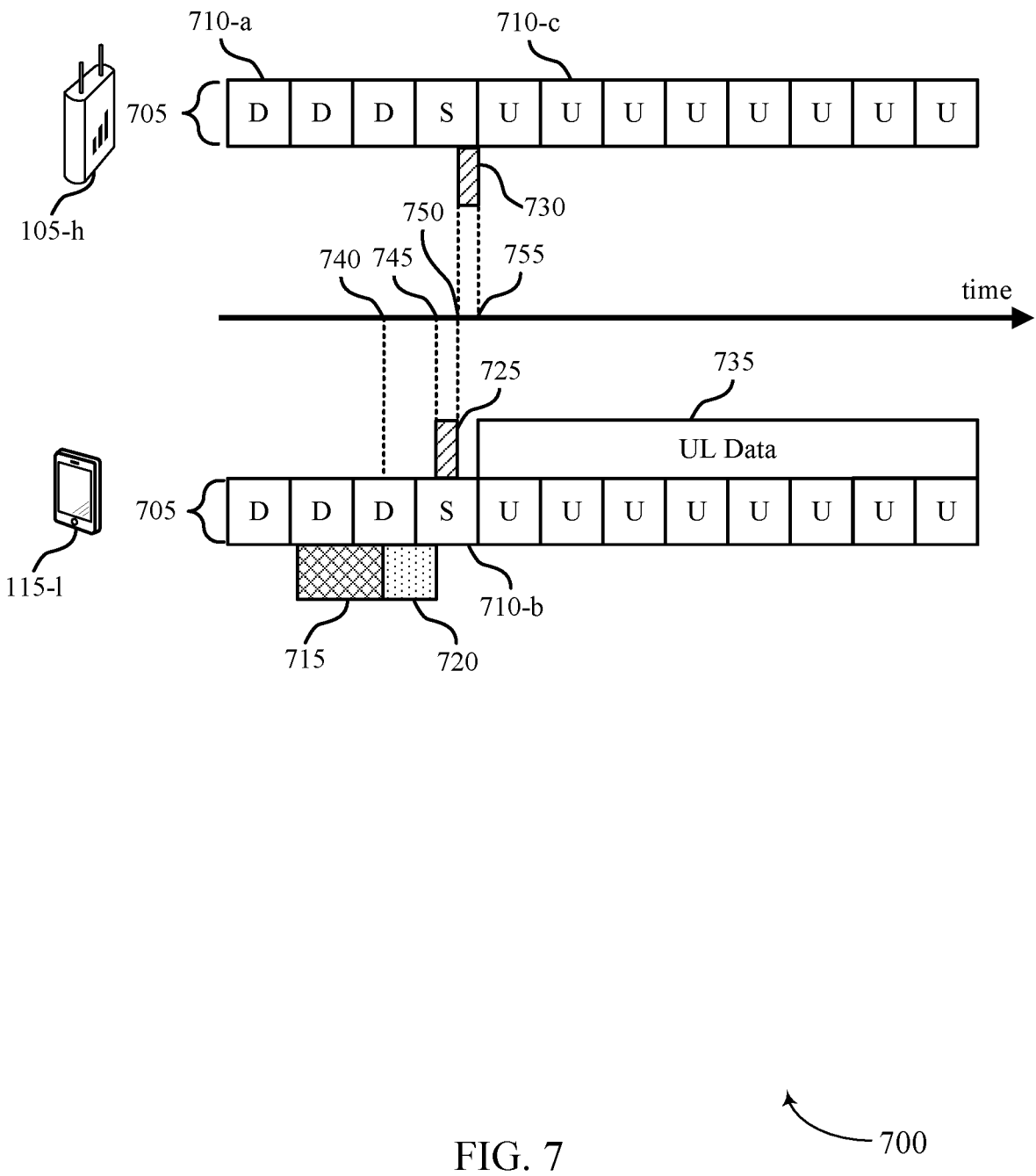

FIG. 7 illustrates an example of a timeline 700 that supports autonomous uplink channel clearance signaling. For example, timeline 700 may demonstrate channel clearance signaling techniques to reduce intra-cell UE ambiguity and collisions that may occur in an autonomous uplink wireless system. Timeline 700 may illustrate channel clearance signaling (e.g., a RTS/CTS signaling exchange or handshake) between a UE 115-l and a base station 105-h within a TDD configuration 705. UE 115-l and base station 105-h may be examples of UEs 115 and base stations 105 described above with reference to FIG. 1.

Upon identifying data for uplink transmission, UE 115-l may successfully complete a CCA 715 at a time 740. Upon successful completion of the CCA 715, a TDD configuration 705 for the uplink transmission may be specified. In some embodiments, the TDD configuration 705 for the uplink transmission may be specified by the UE 115-*l* and may be based on the amount of data available for uplink transmission, for example. In some examples, the TDD configuration 705 for the uplink transmission may be specified by the base station 105-*h* (e.g., through RRC). The TDD uplink configuration 705 may include a number of subframes 710 (e.g., 12 subframes in the example of FIG. 7). Subframes 710 may be configured as uplink subframes 710-*c*, downlink subframes 710-*a*, or special subframes 710-*b* as discussed above with reference to FIGS. 1 and 6. In some cases, the initial subframe of the TDD uplink configuration 705 may be configured as a special subframe 710-*b*.

Following the successful CCA 715, a UE 115-*l* may begin transmission of a busy signal 720 (e.g., at time 740). Busy signal 720 may be used to reserve the channel until UE 115-*l* can initiate channel clearance signaling (e.g., an RTS/CTS handshake) with base station 105-*h* (e.g., at time 745). In some examples, busy signal 720 is transmitted until a first part of an initial special subframe 710-*b*.

UE 115-*l* may then send an RTS signal 725 at some first portion of the initial special subframe 710-*b* (e.g., at time 745) following the cessation of the busy signal 720. Base station 105-*h* may receive RTS signal 725 and subsequently transmit a CTS signal 730 at some later time 750 during the initial special subframe 710-*b*. As an example, the CTS signal 730 may be sent at a later portion (e.g., the end) of the initial special subframe 710-*b*. In some embodiments, the CTS signal 730 may contain control and identification information, as discussed herein. UE 115-*l* may receive the CTS signal 730 and subsequently begin transmitting uplink data 735 at some time 755.

The channel clearance signals (e.g., RTS 725 and CTS 730) may be Wi-Fi waveforms transmitted with a Wi-Fi radio of UE 115-*l* or the channel clearance signals may be similar in structure to Wi-Fi waveforms, which may assist subframe boundary alignment. If the RTS 725 and CTS 730 correspond to Wi-Fi waveforms, they may be sent with a preamble. However, implementation constraints may preclude a UE 115-*l* from sending an RTS 725 with a preamble. As an example, the inclusion of a preamble in RTS 725 may, in some cases, result in undesirable overhead for the transmission. In the case of the CTS 730 sent with a preamble, some neighbor UEs 115 within a PD threshold may be muted, which may or may not be desirable in different implementations.

Alternatively, the channel clearance signals may be sent without a preamble. For example, an RTS 725 without a preamble may effectively function as an extension of busy signal 720. In this case the RTS 725 may prevent other UEs 115 within an ED threshold from attempting to access the channel. Additionally, the RTS 725 may contain UE 115-*l* identification information. A CTS signal 730 sent without a preamble may reach other UEs 115 within an ED threshold and prevent them from transmitting. These UEs 115 may represent potential hidden nodes as discussed above with respect to FIG. 4. In some examples, either the RTS 725 or CTS 730 may be sent with a preamble while the other may be sent without a preamble.

Figure 8:
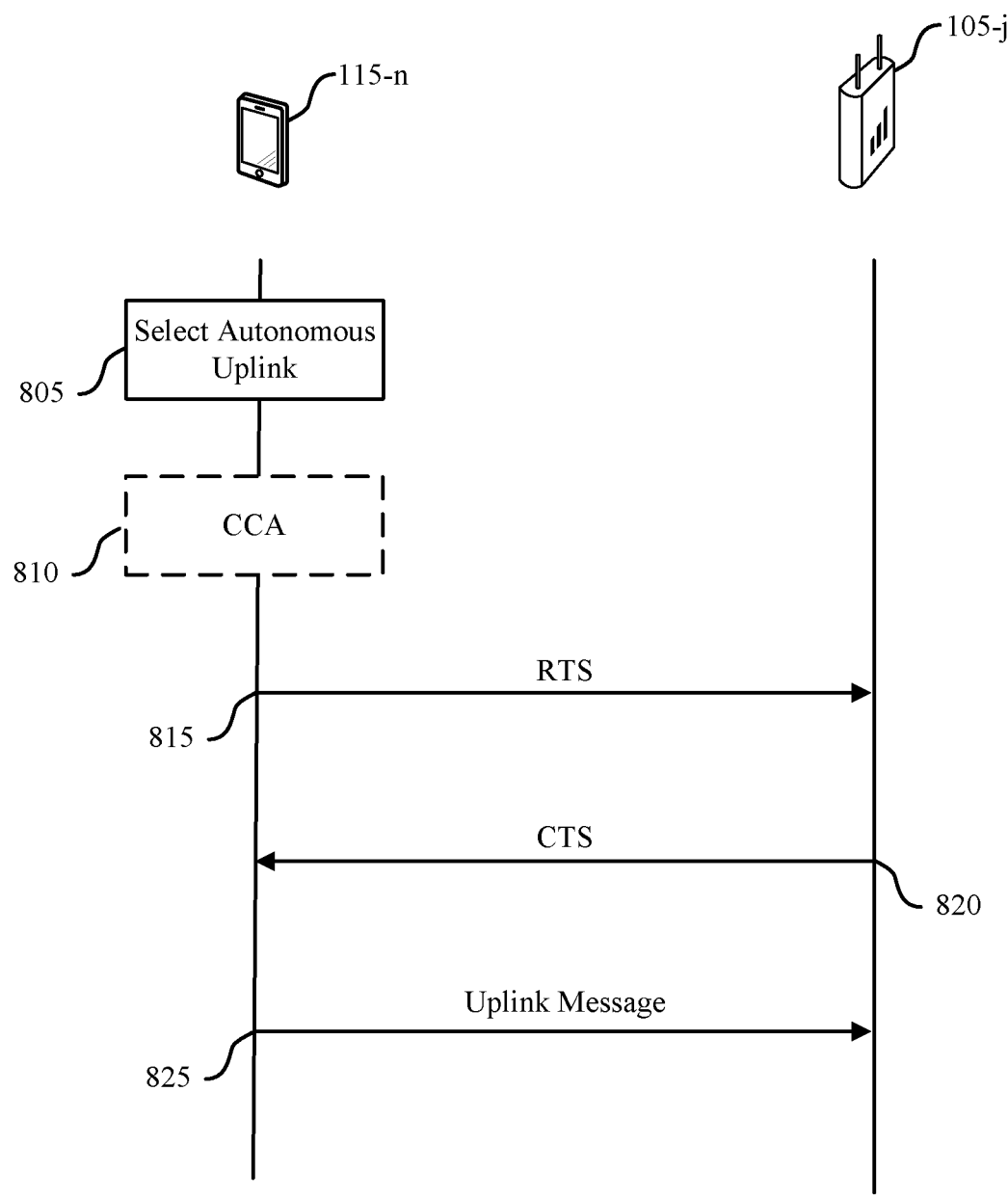
FIGS. 8 and 9 illustrate example of process flows that support autonomous uplink channel clearance signaling in accordance with aspects of the present disclosure.

FIG. 8 illustrates an example of a process flow 800 diagram in a system that supports autonomous uplink channel clearance signaling. Process flow 800 includes UE 115-*n* and base station 105-*j*, which may be examples of UEs 115 and base stations 105 as described with reference to FIGS. 1 through 7. Additionally, process flow 800 may refer to an RTS signal and/or a CTS signal, which may resemble aspects of the corresponding signals discussed above with reference to FIG. 7.

UE 115-*n* may select an autonomous uplink mode for transmission in an unlicensed radio frequency spectrum band (e.g., 5 GHz) at 805. The autonomous uplink mode may support unscheduled uplink transmissions (e.g., transmissions without a predicate assignment of resources). UE 115-*n* may, in some cases, perform a CCA at 810. The CCA may involve energy detection or preamble detection, wherein the specific format may be based at least in part on the autonomous uplink mode selected at 805.

At 815, UE 115-*n* may transmit a first channel clearance signal (e.g., an RTS). The first channel clearance signal may be based on or configured according to an RRC message received from base station 105-*j*. The RRC message may contain a configuration for channel clearance signaling. The first channel clearance signal may further depend on the autonomous uplink mode selected at 805 and/or whether a successful CCA has been performed at 810. The first channel clearance signal may contain a UE identifier (e.g., to help base station 105-*j* distinguish UE 115-*n*). The transmission power level of the first channel clearance signal may be based at least in part on a characteristic of another UE 115. In some cases, the characteristic of the other UE 115 may be determined based on the CCA performed at 810.

At 820, base station 105-*j* may transmit a second channel clearance signal (e.g., a CTS), in response to receiving the first channel clearance signal. The second channel clearance signal may contain scheduling information. As an example, the second clearance signal may contain a TDD frame structure configuration for use in autonomous uplink. As another example, the second channel clearance signal may contain some combination of a MCA, TxOP duration, HARQ information, or the like, for the autonomous uplink mode selected at 805. The second channel clearance signal may further be transmitted at a special power level. An example calculation is described above with reference to FIG. 5A. In some cases, 815 and 820 may occur within a same time transmission interval.

At 825, UE 115-*n* may begin transmission of an uplink message (e.g., transmission of an unscheduled uplink message). The uplink message may be transmitted based on receiving the second channel clearance signal at 820. The uplink message may additionally be transmitted based on identifying a signal strength indicator (e.g., RSSI) associated with a neighboring wireless node.

Figure 9:
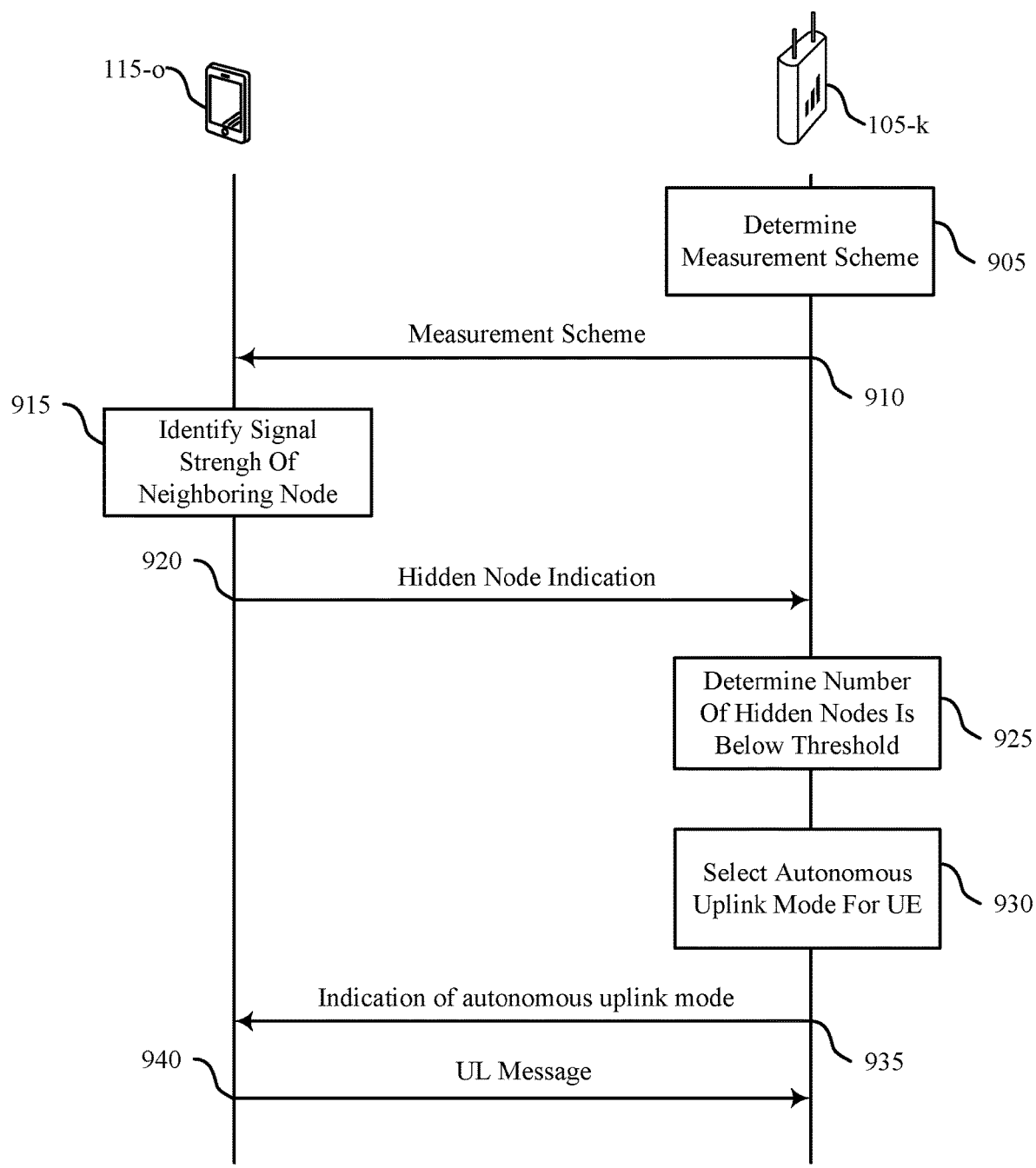

FIG. 9 illustrates an example of a process flow 900 for autonomous uplink benefit identification in accordance with one or more aspects of the present disclosure. Process flow 900 may include a UE 115-*o* in communication with a base station 105-*k*, which may be examples of or may represent aspects of techniques performed by a UE 115 or base station 105 as described above.

At 905, base station 105-*k* may determine a measurement scheme. The measurement scheme may include an indication to measure one or more neighboring nodes. Examples of a neighboring node may include any of a UE, a base station, an AP, or a STA that is a neighbor of UE 115-*o*. The indication may indicate that UE 115-*o* perform a signal strength measurement (e.g., RSSI) of one or more neighboring nodes, or may indicate that UE 115-*o* identify a set of neighboring nodes that may be potential hidden nodes. UE 115-*o* may identify a set of neighboring nodes as potential hidden nodes based on a whether a signal strength associated with a neighboring nodes is below a threshold (e.g., an ED or PD threshold).

At 910, base station 105-*k* may transmit the measurement scheme determined at 905 to UE 115-*o*. The measurement scheme may include a report type (e.g., periodic or triggered) indicating to UE 115-*o* when to report the obtained measurements to the base station 105-*k*.

After receiving the measurement scheme transmitted by the base station 105-*k* at 910, UE 115-*o* may identify or measure a signal strength of one or more neighboring nodes at 915. In some cases, UE 115-*o* may measure the signal strength of one or more neighboring nodes according to the measurement scheme. Based on the identified signal strength, UE 115-*o* may generate a set of nodes measured according to the measurement scheme, some of which may be potential hidden nodes.

At 920, UE 115-*o* may transmit a hidden node indication to base station 105-*k*. The hidden node indication may include a signal strength indication for one or more neighboring nodes or may include a set of neighboring nodes that may be potential hidden nodes.

After receiving the hidden node indication from UE 115-*o* at 920, base station 105-*k* may determine that a number of hidden nodes for UE 115-*o* is below a given threshold at 925. In some examples, base station 105-*k* may identify or measure a signal strength of one or more neighboring nodes and generate a list of neighboring nodes based on the identification. The list of neighboring nodes may include potential hidden nodes for the UE 115-*o*. Base station 105-*k* may also generate a list of hidden nodes based at least in part on the hidden node indication and the signal strength from one or more neighboring nodes. For example, base station 105-*k* may generate a set difference between a set of nodes included in the hidden node indication and the generated list of neighboring nodes measured by base station 105-*k*. That is, any neighboring node in the list generated by the base station 105-*k* that is not in the list of nodes in the hidden node indication may be identified as a hidden node. Based on this set difference, base station 105-*k* may determine the number of hidden nodes, and compare the number of hidden nodes for UE 115-*o* to a threshold.

In some examples, base station 105-*k* may determine that a number of hidden nodes is below a threshold by measuring a channel metric (e.g., CQI backoff or contention window size) associated with UE 115-*o*. Based on this measurement, the hidden node indication, or the number of hidden nodes, the base station may select an autonomous uplink mode for UE 115-*o* at 930. In some examples, base station 105-*k* may determine that the CQI backoff metric or the contention window size is above a threshold. Base station 105-*k* may maintain a CQI histogram for the UE 115-*o* based at least in part on uplink ACK/NACK feedback from UE 115-*o*. This information may also be used to select an autonomous uplink mode for UE 115-*o*.

At 935, base station 105-*k* may transmit an indication of the autonomous uplink mode to UE 115-*o*. In some examples, the autonomous uplink mode indication may be transmitted in an RRC configuration. For instance, base station 105-*k* may transmit an RRC configuration to the UE 115-*o* including an indication to operate in an autonomous uplink mode. In other instances, the base station 105-*k* may transmit an RRC configuration including an indication to operate in a grant based mode, which may occur if base station 105-*k* determines that the CQI backoff metric is above a given threshold. At 940, UE 115-*o* may transmit an uplink message according to the indication.

Figure 10:
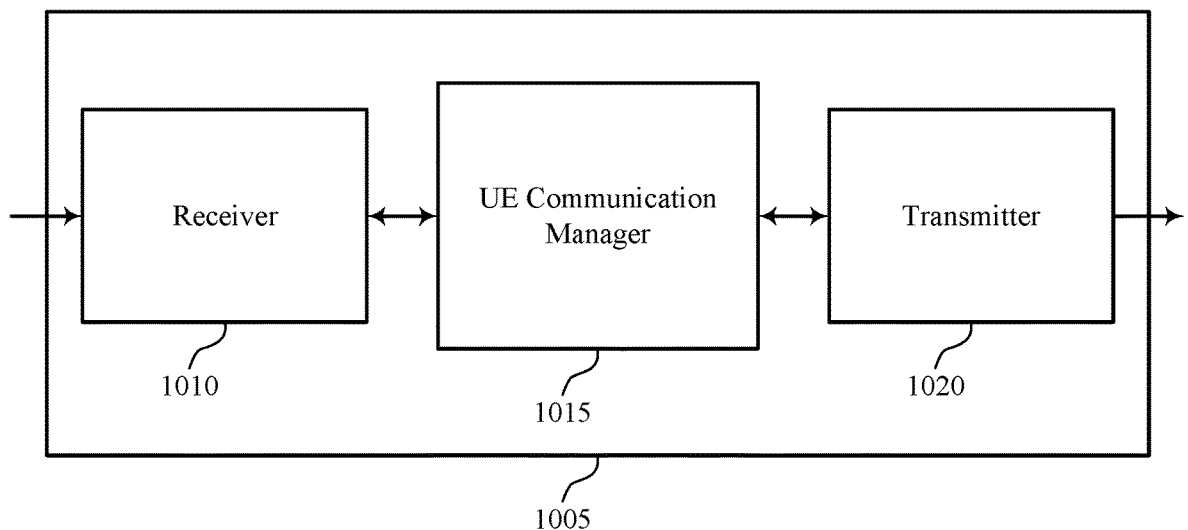
FIGS. 10 through 12 show block diagrams of a device or devices that support autonomous uplink channel clearance signaling in accordance with aspects of the present disclosure.

FIG. 10 shows a block diagram 1000 of a wireless device 1005 that supports autonomous uplink channel clearance signaling in accordance with various aspects of the present disclosure. Wireless device 1005 may be an example of aspects of a UE 115 as described with reference to FIG. 1. Wireless device 1005 may include receiver 1010, UE communication manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to autonomous uplink channel clearance signaling, etc.). Information may be passed on to other components of the device. The receiver 1010 may be an example of aspects of the transceiver 1335 described with reference to FIG. 13.

UE communication manager 1015 may be an example of aspects of the UE communication manager 1315 described with reference to FIG. 13. UE communication manager 1015 may select an autonomous uplink mode for transmission in an unlicensed radio frequency spectrum band, where the autonomous uplink mode supports unscheduled uplink transmissions. UE communication manager 1015 may transmit, in combination with transmitter 1020, a first channel clearance signal based on selecting the autonomous uplink mode. UE communication manager 1015 may receive, in combination with receiver 1010, a second channel clearance signal from a base station in response to the first channel clearance signal UE communication manager 1015 may transmit, in combination with transmitter 1020, an uplink message in the unlicensed radio frequency spectrum band according to the autonomous uplink mode, where the uplink message is transmitted based on receiving the second channel clearance signal.

UE communication manager 1015 may measure a signal from a neighboring node in an unlicensed radio frequency spectrum band. UE communication manager 1015 may transmit, in combination with transmitter 1020, information associated with the measurement to a base station. UE communication manager 1015 may receive, in combination with receiver 1010, a RRC message from the base station, the RRC message including an indication from the base station to operate in an autonomous uplink mode based on the information associated with the measurement, where the autonomous uplink mode supports unscheduled uplink transmissions in the unlicensed radio frequency spectrum band. UE communication manager 1015 may transmit, in combination with transmitter 1020, an uplink message to the base station according to the autonomous uplink mode.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
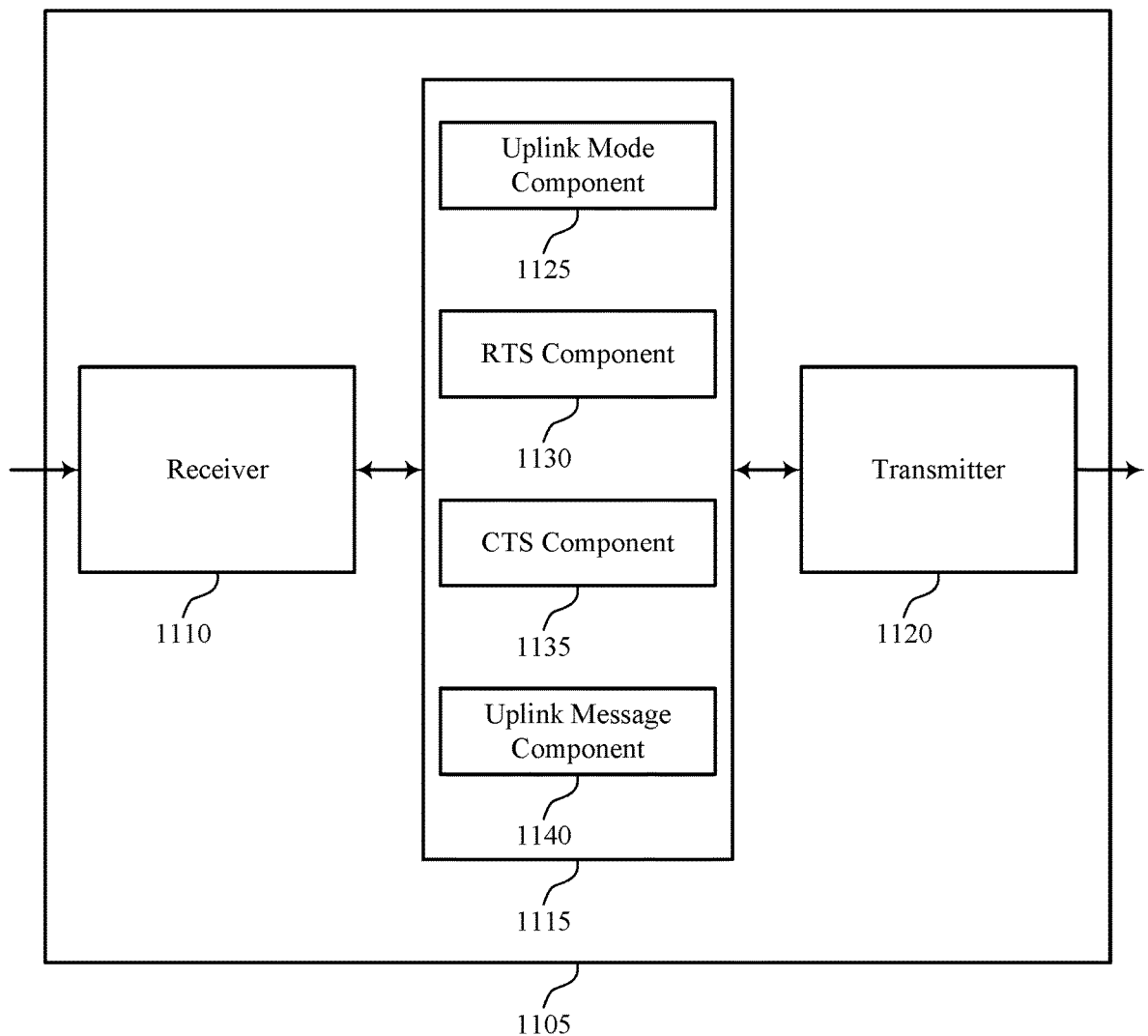

FIG. 11 shows a block diagram 1100 of a wireless device 1105 that supports autonomous uplink channel clearance signaling in accordance with various aspects of the present disclosure. Wireless device 1105 may be an example of aspects of a wireless device 1005 or a UE 115 as described with reference to FIGS. 1 and 10. Wireless device 1105 may include receiver 1110, UE communication manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to autonomous uplink channel clearance signaling, etc.). Information may be passed on to other components of the device. The receiver 1110 may be an example of aspects of the transceiver 1335 described with reference to FIG. 13.

UE communication manager 1115 may be an example of aspects of the UE communication manager 1315 described with reference to FIG. 13. UE communication manager 1115 may also include uplink mode component 1125, RTS component 1130, CTS component 1135, and uplink message component 1140.

Uplink mode component 1125 may select an autonomous uplink mode for transmission in an unlicensed radio frequency spectrum band, where the autonomous uplink mode supports unscheduled uplink transmissions. Uplink mode component 1125 may measure a signal from a neighboring node in an unlicensed radio frequency spectrum band. In some cases, the neighboring node includes a hidden node in a set of hidden nodes. Uplink mode component 1125 may transmit information associated with the measurement to a base station. In some cases, the information associated with the measurement includes an element in a list of neighboring nodes having a signal strength that exceeds a threshold, and transmitting the information includes transmitting a message with the list of neighboring nodes. Uplink mode component 1125 may receive a RRC message from the base station, the RRC message including an indication from the base station to operate in an autonomous uplink mode based on the information associated with the measurement, where the autonomous uplink mode supports unscheduled uplink transmissions in the unlicensed radio frequency spectrum band.

RTS component 1130 may transmit a first channel clearance signal based on selecting the autonomous uplink mode and transmit the first channel clearance signal based on the determined power level. In some cases, the first channel clearance signal includes a UE identifier. In some cases, the first channel clearance signal is transmitted and the second channel clearance signal is received in a same TTI. In some cases, the first channel clearance signal includes a UE identifier.

CTS component 1135 may receive a second channel clearance signal from a base station in response to the first channel clearance signal. In some cases, the first channel clearance signal includes a RTS message and the second channel clearance signal includes a CTS message. In some cases, the second channel clearance signal includes a frame structure indication. In some cases, the frame structure indication includes a TDD configuration for the autonomous uplink mode. In some cases, the second channel clearance signal includes a modulation and coding scheme for the autonomous uplink mode, a TxOP duration for the autonomous uplink mode, or HARQ information for the autonomous uplink mode, or any combination thereof.

Uplink message component 1140 may determine a power level associated with the second channel clearance signal, where the uplink message may be transmitted according to the autonomous uplink mode based on the determined power level. Uplink message component 1140 may transmit an uplink message in the unlicensed radio frequency spectrum band according to the autonomous uplink mode, where the uplink message may be transmitted based on receiving the second channel clearance signal. Uplink message component 1140 may and identify a signal strength indicator associated with a neighbor wireless node, where the uplink message may be transmitted according to the autonomous uplink mode based on the identified signal strength indicator.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
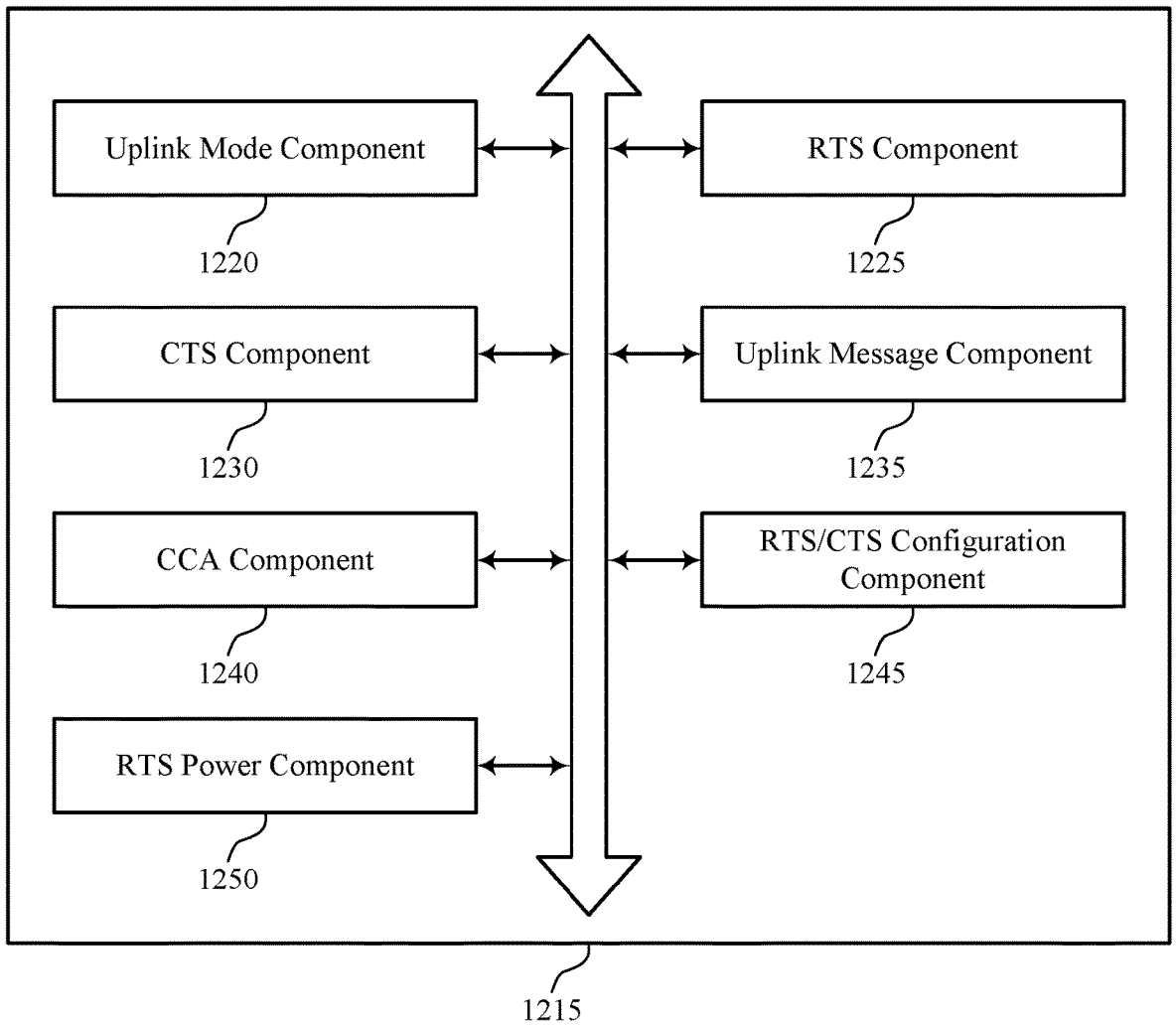

FIG. 12 shows a block diagram 1200 of a UE communication manager 1215 that supports autonomous uplink channel clearance signaling in accordance with various aspects of the present disclosure. The UE communication manager 1215 may be an example of aspects of a UE communication manager 1015, a UE communication manager 1115, or a UE communication manager 1315 described with reference to FIGS. 10, 11, and 13. The UE communication manager 1215 may include uplink mode component 1220, RTS component 1225, CTS component 1230, uplink message component 1235, CCA component 1240, RTS/CTS configuration component 1245, and RTS power component 1250. Each of these modules may communicate, directly or indirectly, with one another (e.g., via one or more buses).

Uplink mode component 1220 may select an autonomous uplink mode for transmission in an unlicensed radio frequency spectrum band, where the autonomous uplink mode supports unscheduled uplink transmissions. Uplink mode component 1220 may measure a signal from a neighboring node in an unlicensed radio frequency spectrum band. In some cases, the neighboring node includes a hidden node in a set of hidden nodes. Uplink mode component 1220 may transmit information associated with the measurement to a base station. In some cases, the information associated with the measurement includes an element in a list of neighboring nodes having a signal strength that exceeds a threshold, and transmitting the information includes transmitting a message with the list of neighboring nodes. Uplink mode component 1220 may receive a RRC message from the base station, the RRC message including an indication from the base station to operate in an autonomous uplink mode based on the information associated with the measurement, where the autonomous uplink mode supports unscheduled uplink transmissions in the unlicensed radio frequency spectrum band. Uplink mode component 1220 may receive, based on a channel metric, an indication from the base station to operate in a grant-based mode, where the grant-based mode supports uplink transmissions using resources assigned by a grant from the base station. In some instances, the channel metric may include a CQI backoff, a contention window metric, or a combination thereof.

RTS component 1225 may transmit a first channel clearance signal based on selecting the autonomous uplink mode and transmit the first channel clearance signal based on the determined power level. In some cases, the first channel clearance signal includes a UE identifier. In some cases, the first channel clearance signal is transmitted and the second channel clearance signal is received in a same TTI. In some cases, the first channel clearance signal includes a UE identifier.

CTS component 1230 may receive a second channel clearance signal from a base station in response to the first channel clearance signal. In some cases, the first channel clearance signal includes an RTS message and the second channel clearance signal includes a CTS message. In some examples, the second channel clearance signal includes a frame structure indication. The frame structure indication may include a TDD configuration for the autonomous uplink mode. In some cases, the second channel clearance signal includes a modulation and coding scheme for the autonomous uplink mode, a TxOP duration for the autonomous uplink mode, or HARQ information for the autonomous uplink mode, or any combination thereof.

Uplink message component 1235 may determine a power level associated with the second channel clearance signal, where the uplink message may be transmitted according to the autonomous uplink mode based on the determined power level. Uplink message component 1235 may transmit an uplink message in the unlicensed radio frequency spectrum band according to the autonomous uplink mode, where the uplink message may be transmitted based on receiving the second channel clearance signal. Uplink message component 1235 may identify a signal strength indicator associated with a neighbor wireless node, where the uplink message may be transmitted according to the autonomous uplink mode based on the identified signal strength indicator. Uplink message component 1235 may periodically transmit a result associated with the measurement to the base station and transmit a measurement result based at least on the received request.

CCA component 1240 may perform a successful CCA before transmitting the first channel clearance signal, where a format of the CCA may be based on the autonomous uplink mode and the first channel clearance signal may be transmitted based on the successful CCA. CCA component 1240 may determine that a strength of the signal from the neighboring node exceeds a threshold, where the information associated with the measurement is transmitted based on the determination that the strength of the signal from the neighboring node exceeds the threshold.

RTS/CTS configuration component 1245 may receive, from the base station, a RRC message that includes a configuration for channel clearance signaling, where the first channel clearance signal may be transmitted based on receiving the configuration.

RTS power component 1250 may determine a power level for transmission of the first channel clearance signal based on a characteristic of another UE. RTS power component 1250 may receive, from the base station, a message that includes a request for a measurement capability and transmit an additional uplink message that indicates the measurement capability in response to the request, where the measurement capability includes a WLAN signal strength capability. In some cases, the measurement capability includes a measurement parameter configuration includes a measurement frequency, a measurement dwell time, a signal strength threshold, or any combination thereof. RTS power component 1250 may receive, from the base station, a request to measure the signal of the neighboring node and receive a measurement scheme from the base station, where measuring the signal from the neighboring node is based on the measurement scheme. In some cases, the neighboring node includes at least one of a UE, a neighbor base station, an access point, or a station.

Figure 13:
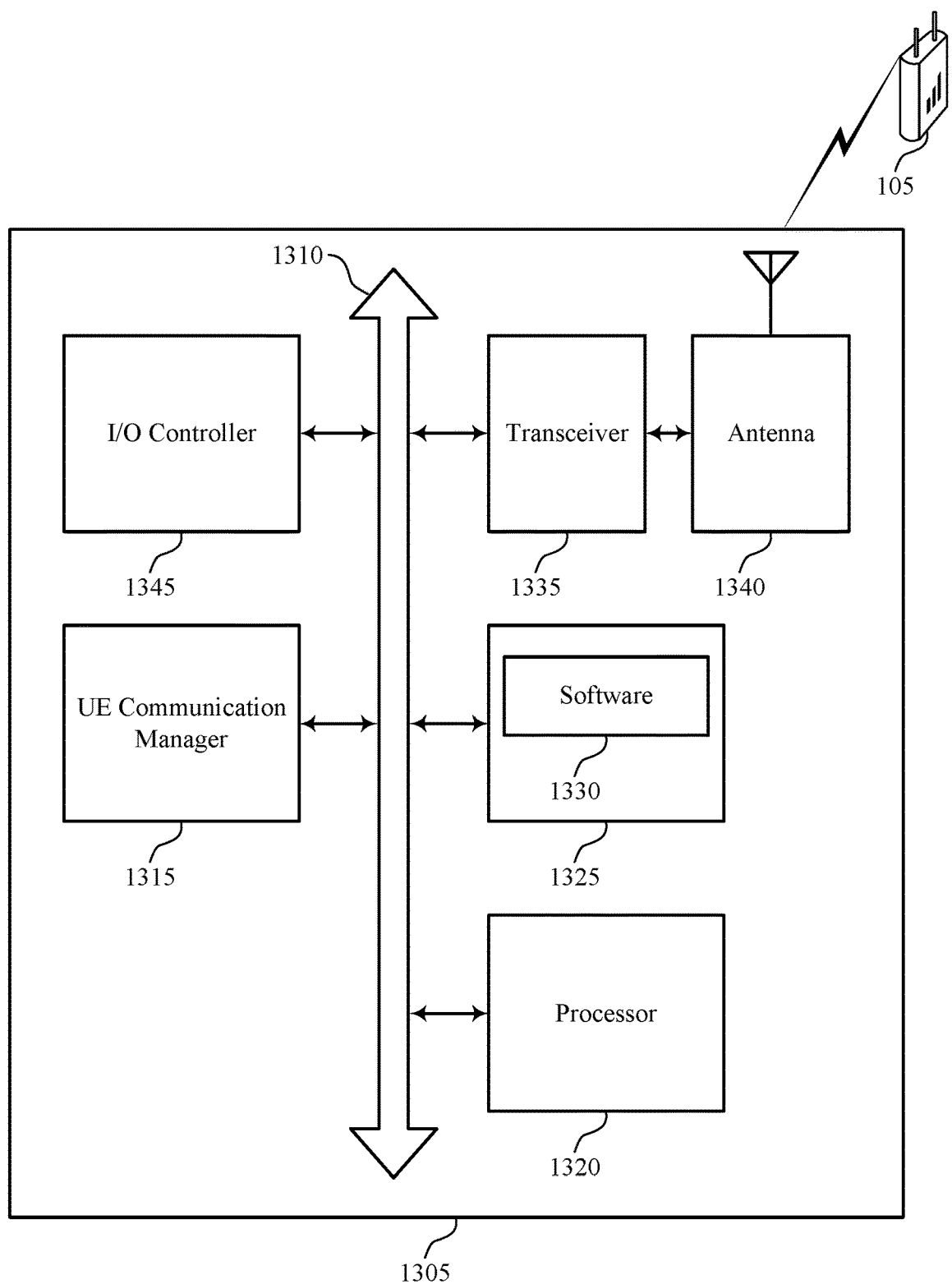
FIG. 13 illustrates a block diagram of a system, including a device (e.g., a UE), that supports autonomous uplink channel clearance signaling in accordance with aspects of the present disclosure.

FIG. 13 shows a diagram of a system 1300 including a device 1305 that supports autonomous uplink channel clearance signaling in accordance with various aspects of the present disclosure. Device 1305 may be an example of or include the components of wireless device 1005, wireless device 1105, or a UE 115 as described above, e.g., with reference to FIGS. 1, 10 and 11. Device 1305 may include components for bi-directional voice and data communications including components for transmitting and receiving communications, including UE communication manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting autonomous uplink channel clearance signaling).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware and/or software operation such as the interaction with peripheral components or devices.

Software 1330 may include code to implement aspects of the present disclosure, including code to support autonomous uplink channel clearance signaling. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system.

Figure 14:
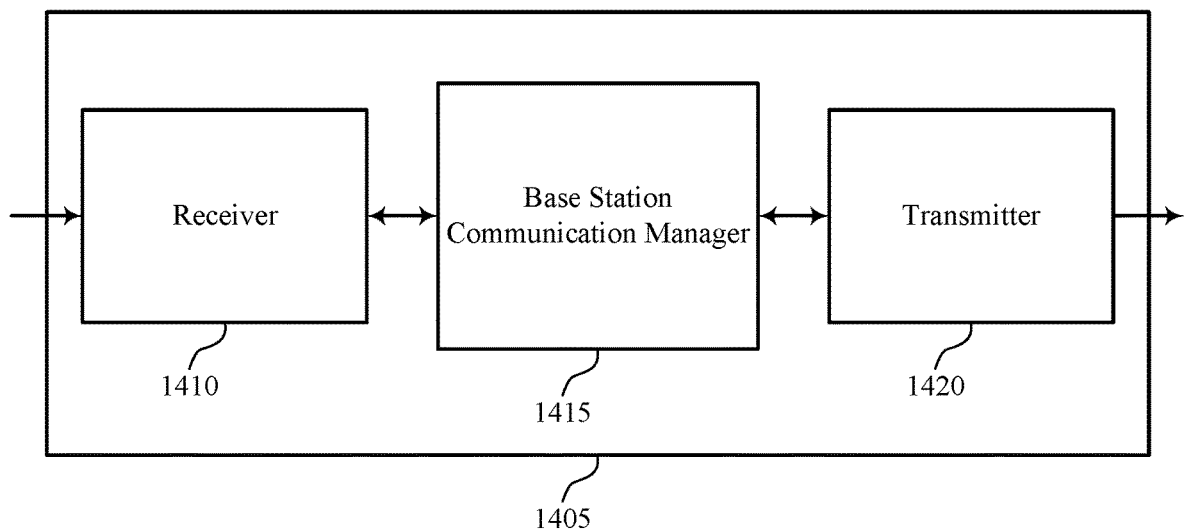
FIGS. 14 through 16 show block diagrams of a device or devices that support autonomous uplink channel clearance signaling in accordance with aspects of the present disclosure.

FIG. 14 shows a block diagram 1400 of a wireless device 1405 that supports autonomous uplink channel clearance signaling in accordance with various aspects of the present disclosure. Wireless device 1405 may be an example of aspects of a base station 105 as described with reference to FIG. 1. Wireless device 1405 may include receiver 1410, base station communication manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to autonomous uplink channel clearance signaling, etc.). Information may be passed on to other components of the device. The receiver 1410 may be an example of aspects of the transceiver 1735 described with reference to FIG. 17.

Base station communication manager 1415 may be an example of aspects of the base station communication manager 1715 described with reference to FIG. 17. Base station communication manager 1415 may select an autonomous uplink mode for communication in an unlicensed radio frequency spectrum band with a UE, where the autonomous uplink mode supports unscheduled uplink transmissions. Base station communication manager 1415 may receive, in combination with receiver 1410, a first channel clearance signal from the UE based on selecting the autonomous uplink mode. Base station communication manager 1415 may transmit, in combination with transmitter 1420, a second channel clearance signal to the UE in response to the first channel clearance signal. Base station communication manager 1415 may receive, in combination with receiver 1410, an uplink message from the UE in the unlicensed radio frequency spectrum band according to the autonomous uplink mode and based on receiving the second channel clearance signal. Base station communication manager 1415 may identify a set of hidden nodes UE, select an autonomous uplink mode for the UE based on identifying the set of hidden nodes, where the autonomous uplink mode supports unscheduled uplink transmissions, and, in combination with transmitter 1420, transmit an indication of the autonomous uplink mode to the UE.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may include a single antenna, or it may include a set of antennas.

Figure 15:
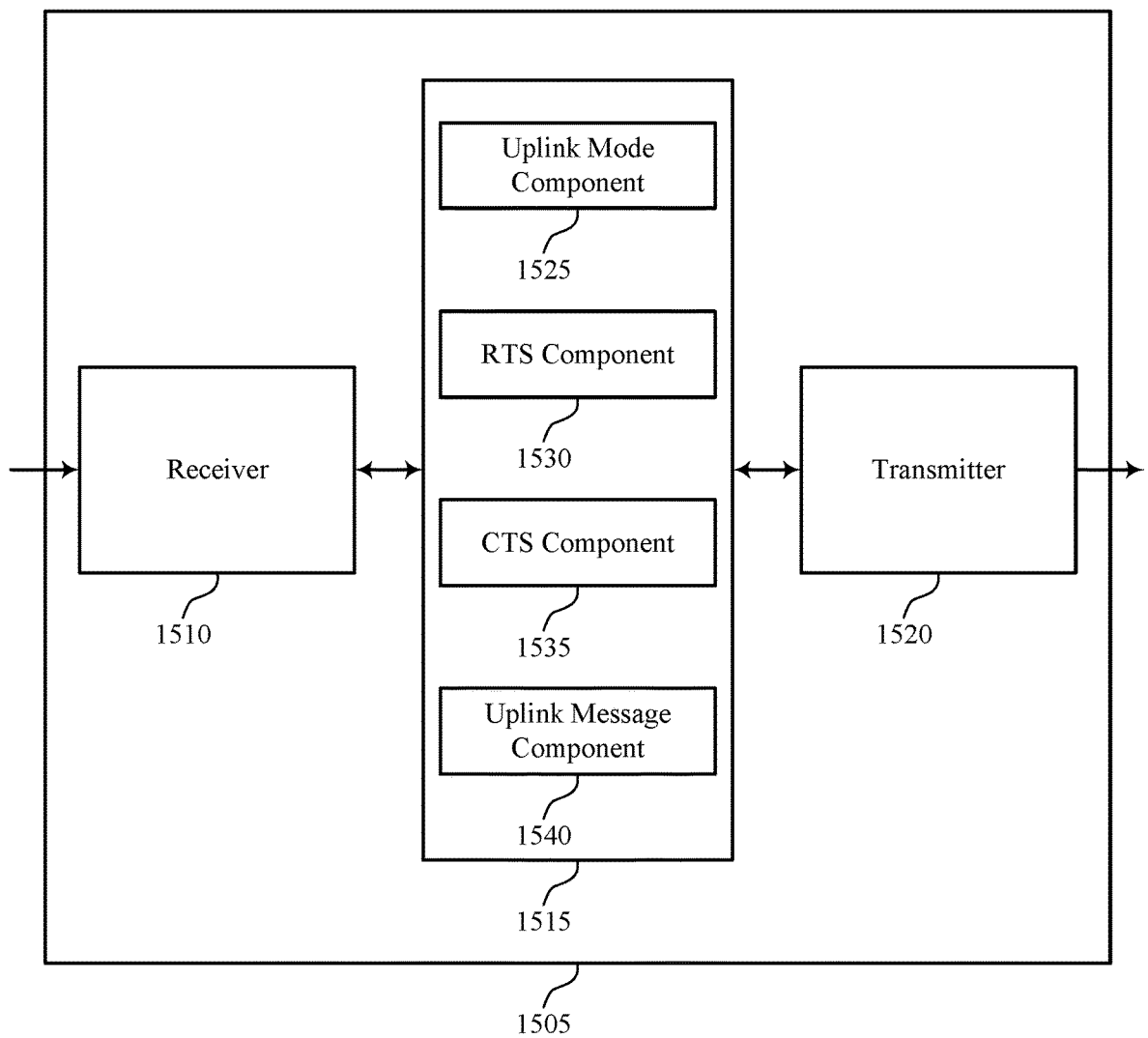

FIG. 15 shows a block diagram 1500 of a wireless device 1505 that supports autonomous uplink channel clearance signaling in accordance with various aspects of the present disclosure. Wireless device 1505 may be an example of aspects of a wireless device 1405 or a base station 105 as described with reference to FIGS. 1 and 14. Wireless device 1505 may include receiver 1510, base station communication manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to autonomous uplink channel clearance signaling, etc.). Information may be passed on to other components of the device. The receiver 1510 may be an example of aspects of the transceiver 1735 described with reference to FIG. 17.

Base station communication manager 1515 may be an example of aspects of the base station communication manager 1715 described with reference to FIG. 17. Base station communication manager 1515 may also include uplink mode component 1525, RTS component 1530, CTS component 1535, and uplink message component 1540.

Uplink mode component 1525 may select an autonomous uplink mode for communication in an unlicensed radio frequency spectrum band with a UE, where the autonomous uplink mode supports unscheduled uplink transmissions. In some cases, uplink mode component 1525 may select the autonomous uplink mode based at least in part on a determined location of the UE relative to at least one other UE. Uplink mode component 1525 may identify a set of hidden nodes for a UE. In some cases, identifying the set of hidden nodes for the UE includes determining that a number of hidden nodes in the set is below a threshold. In some cases, identifying the set of hidden nodes for the UE includes determining that a signal strength for each hidden node in the set is below a threshold. In some cases, the set of hidden nodes is identified based on the information associated with the hidden node received from the UE. Uplink mode component 1525 may transmit an indication of the autonomous uplink mode to the UE and transmit an indication to operate in a grant-based mode to the UE, where the grant-based mode supports uplink transmissions using resources assigned by a grant.

RTS component 1530 may receive a first channel clearance signal from the UE based on selecting the autonomous uplink mode. CTS component 1535 may transmit a second channel clearance signal to the UE in response to the first channel clearance signal and transmit the second channel clearance signal based on the determined power level. In some cases, the first channel clearance signal includes an RTS message and the second channel clearance signal includes a CTS message. In some cases, the second channel clearance signal includes a modulation and coding scheme for the autonomous uplink mode, a TxOP duration for the autonomous uplink mode, or HARQ information for the autonomous uplink mode, or any combination thereof. In some cases, the second channel clearance signal includes a frame structure indication. The frame structure indication may include a TDD configuration for the autonomous uplink mode. In some cases, the first channel clearance signal is received and the second channel clearance signal is transmitted in a same TTI.

Uplink message component 1540 may receive an uplink message from the UE in the unlicensed radio frequency spectrum band according to the autonomous uplink mode and based on receiving the second channel clearance signal.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may include a single antenna, or it may include a set of antennas.

Figure 16:
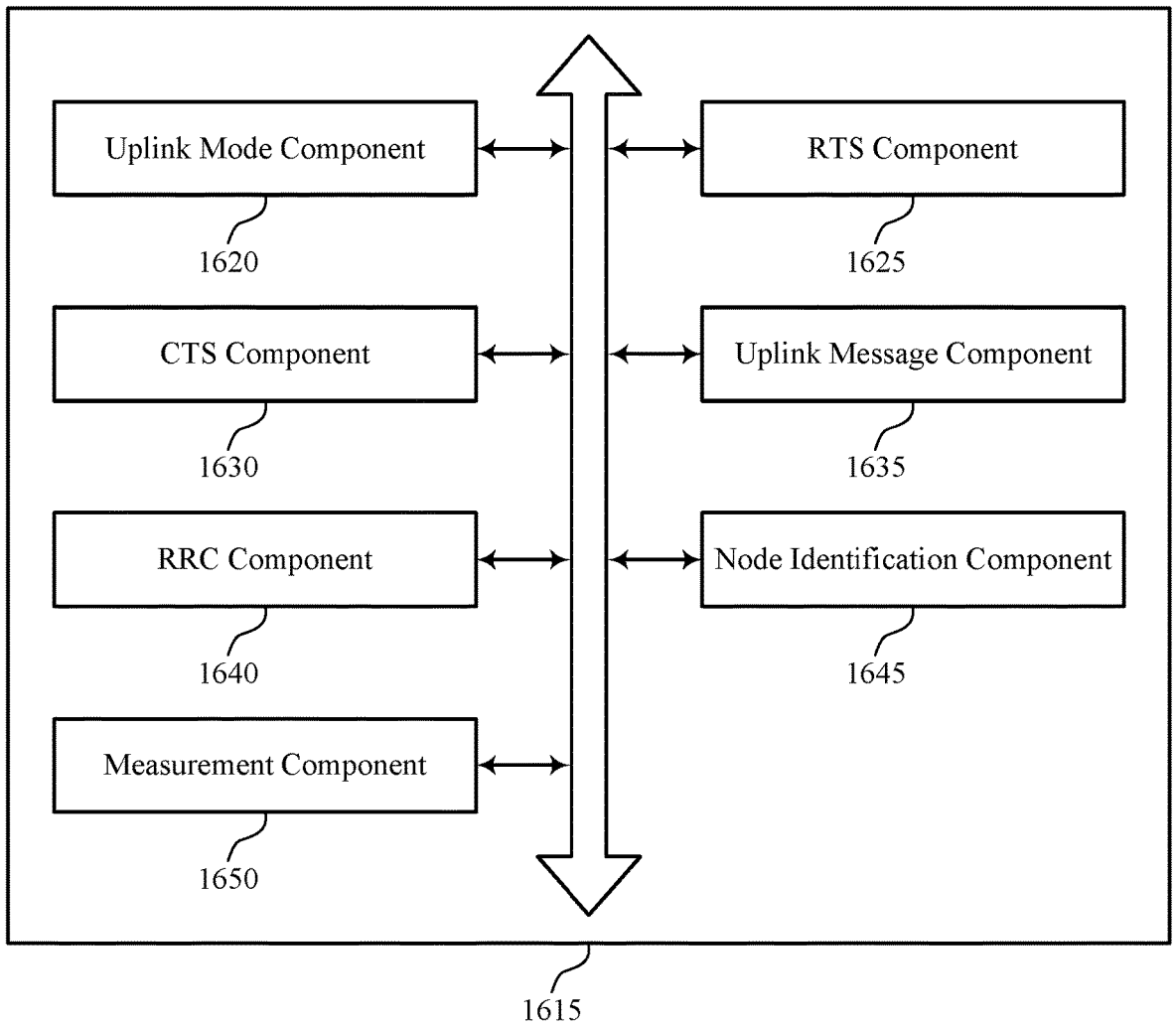

FIG. 16 shows a block diagram 1600 of a base station communication manager 1615 that supports autonomous uplink channel clearance signaling in accordance with various aspects of the present disclosure. The base station communication manager 1615 may be an example of aspects of a base station communication manager 1715 described with reference to FIGS. 14, 15, and 17. The base station communication manager 1615 may include uplink mode component 1620, RTS component 1625, CTS component 1630, uplink message component 1635, RRC component 1640, node identification component 1645, and measurement component 1650. Each of these modules may communicate, directly or indirectly, with one another (e.g., via one or more buses).

Uplink mode component 1620 may select an autonomous uplink mode for communication in an unlicensed radio frequency spectrum band with a UE, where the autonomous uplink mode supports unscheduled uplink transmissions.

Uplink mode component 1620 may transmit an indication of the autonomous uplink mode to the UE and transmit an indication to operate in a grant-based mode to the UE, where the grant-based mode supports uplink transmissions using resources assigned by a grant. Uplink mode component 1620 may receive information associated with a hidden node of the set from the UE, where the autonomous uplink mode is selected based on the information associated with the hidden node. Uplink mode component 1620 may receive information associated with a hidden node of the set from the UE, where the information associated with the hidden node includes a signal strength indication that is based on the measurement scheme. In some cases, the information associated with the hidden node includes a list of information associated with hidden nodes of the set. In some cases, the information associated with the hidden node includes an indication of a signal strength of the hidden node at the UE.

RTS component 1625 may receive a first channel clearance signal from the UE based on selecting the autonomous uplink mode. CTS component 1630 may transmit a second channel clearance signal to the UE in response to the first channel clearance signal. CTS component 1630 may determine a power level for transmission of the second channel clearance signal based on a characteristic of another UE transmit the second channel clearance signal based on the determined power level. In some cases, the first channel clearance signal includes a RTS message and the second channel clearance signal includes a CTS message. In some cases, the second channel clearance signal includes a modulation and coding scheme for the autonomous uplink mode, a TxOP duration for the autonomous uplink mode, or HARQ information for the autonomous uplink mode, or any combination thereof. In some cases, the second channel clearance signal includes a frame structure indication. The frame structure indication may include a TDD configuration for the autonomous uplink mode. In some cases, the first channel clearance signal is received and the second channel clearance signal is transmitted in a same TTI.

Uplink message component 1635 may receive an uplink message from the UE in the unlicensed radio frequency spectrum band according to the autonomous uplink mode and based on receiving the second channel clearance signal.

RRC component 1640 may transmit, to the UE, a RRC message that includes a configuration for channel clearance signaling, where the second channel clearance signal may be transmitted based on transmitting the configuration. RRC component 1640 may configure the indication of the autonomous uplink mode to be transmitted in a RRC message.

Node identification component 1645 may identify one or more hidden nodes for the UE, where the RRC message may be transmitted based on identifying the one or more hidden nodes. In some cases, at least one of the one or more hidden nodes is another UE associated with a same base station. In some cases, identifying the set of hidden nodes for the UE includes determining that a number of hidden nodes in the set is below a threshold. In some cases, identifying the set of hidden nodes for the UE includes determining that a signal strength for each hidden node in the set is below a threshold. In some cases, the set of hidden nodes is identified based on the information associated with the hidden node received from the UE.

Measurement component 1650 may measure a channel metric for the UE. In some cases, the channel metric includes a channel quality indicator CQI backoff, a contention window metric, or a combination thereof. Measurement component 1650 may determine that the channel metric is above a threshold. Measurement component 1650 may generate a channel metric histogram for the UE, where the channel metric histogram is generated based on uplink feedback from the UE. Measurement component 1650 may transmit a measurement scheme to the UE. In some cases, the measurement scheme includes an indication to measure a neighboring node and the neighbor node includes at least one of a UE, a base station, an access point, or a station, or any combination thereof. In some cases, the measurement scheme includes a periodic report type and a report interval or a triggered report type.

Figure 17:
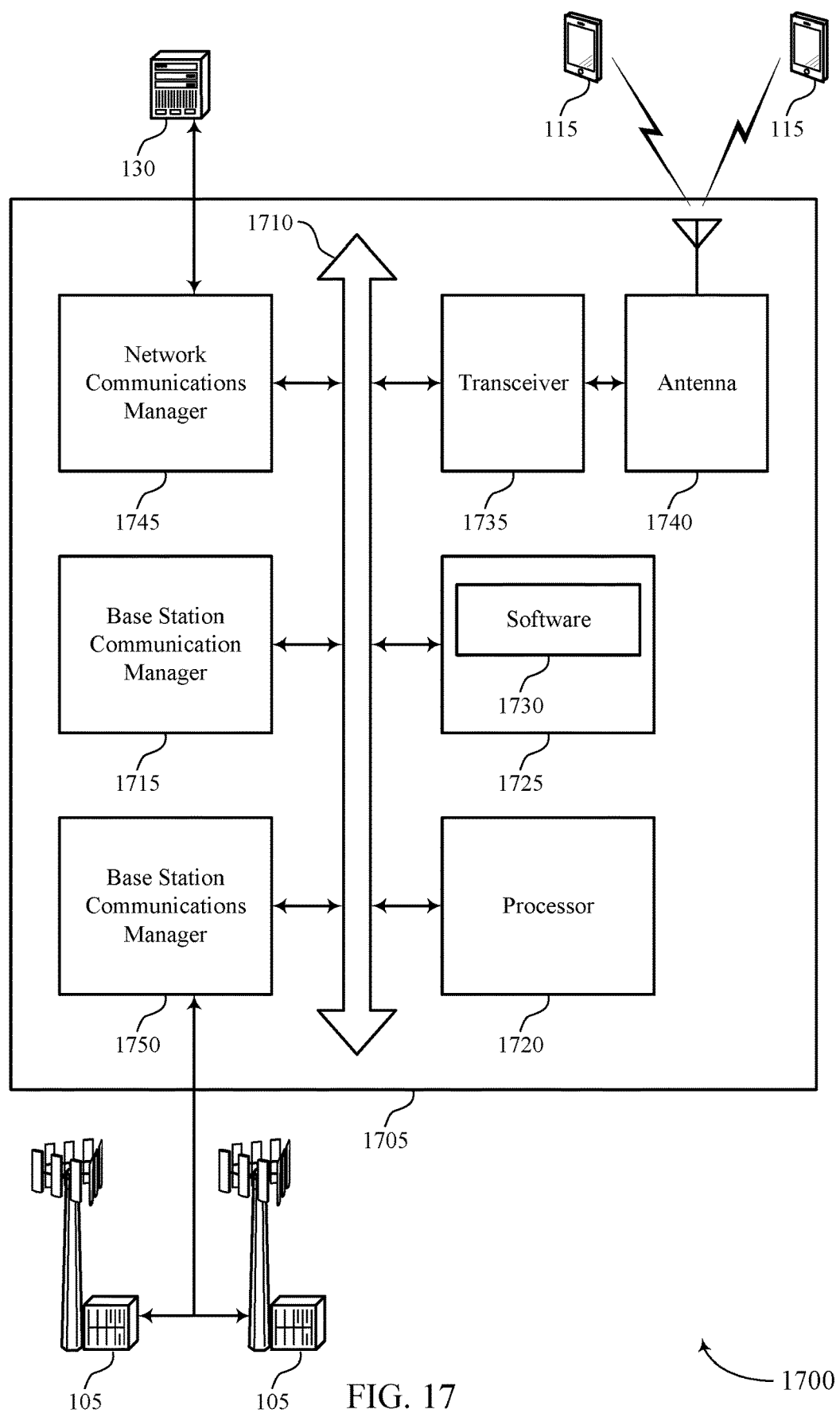
FIG. 17 illustrates a block diagram of a system, including a device (e.g., a base station), that supports autonomous uplink channel clearance signaling in accordance with aspects of the present disclosure.

FIG. 17 shows a diagram of a system 1700 including a device 1705 that supports autonomous uplink channel clearance signaling in accordance with various aspects of the present disclosure. Device 1705 may be an example of or include the components of base station 105 as described above, e.g., with reference to FIG. 1. Device 1705 may include components for bi-directional voice and data communications including components for transmitting and receiving communications, including base station communication manager 1715, processor 1720, memory 1725, software 1730, transceiver 1735, antenna 1740, network communications manager 1745, and base station communications manager 1750. These components may be in electronic communication via one or more buses (e.g., bus 1710). Device 1705 may communicate wirelessly with one or more UEs 115.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting autonomous uplink channel clearance signaling).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware and/or software operation such as the interaction with peripheral components or devices.

Software 1730 may include code to implement aspects of the present disclosure, including code to support autonomous uplink channel clearance signaling. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions. Network communications manager 1745 may manage communications with the core network 130 (e.g., via one or more wired backhaul links). For example, the network communications manager 1745 may manage the transfer of data communications for client devices, such as one or more UEs 115.

Base station communications manager 1750 may manage communications with other base station 105, and may include a controller or scheduler for controlling communications with UEs 115 in cooperation with other base stations 105. For example, the base station communications manager 1750 may coordinate scheduling for transmissions to UEs 115 for various interference mitigation techniques such as beamforming or joint transmission. In some examples, base station communications manager 1750 may provide an X2 interface within an LTE/LTE-A wireless communication network technology to provide communication between base stations 105.

Figure 18:
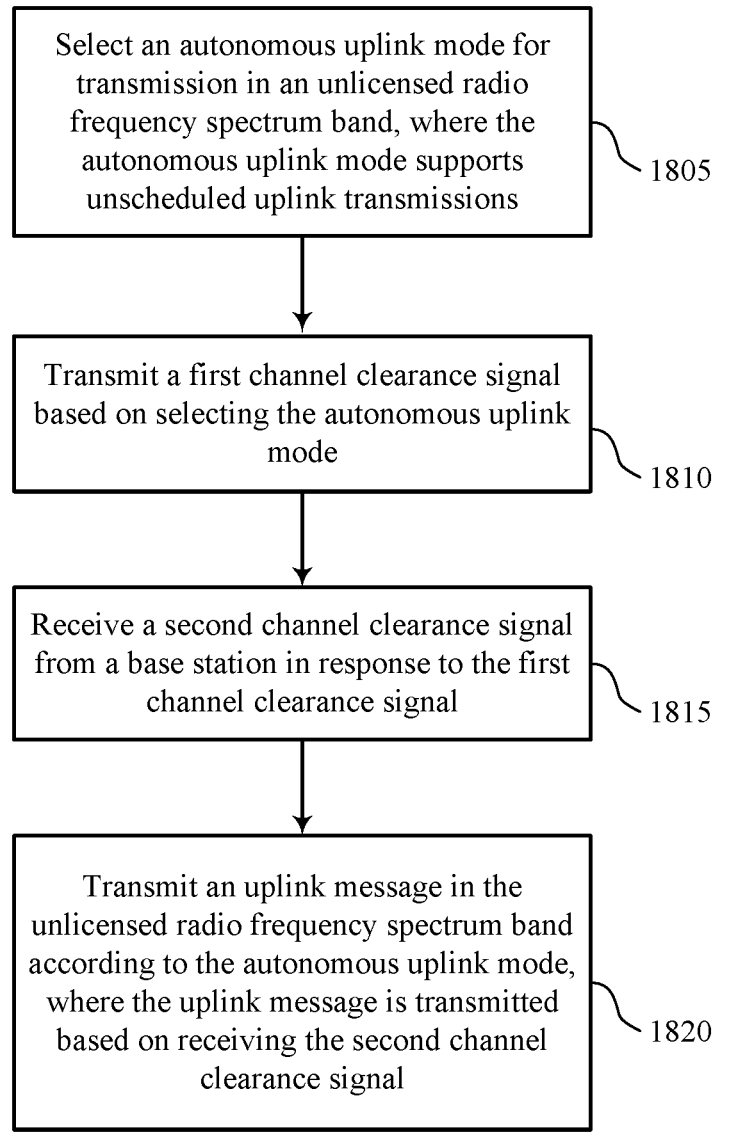
FIGS. 18 through 24 illustrate methods for autonomous uplink channel clearance signaling in accordance with aspects of the present disclosure.

FIG. 18 shows a flowchart illustrating a method 1800 for autonomous uplink channel clearance signaling in accordance with various aspects of the present disclosure. The operations of method 1800 may be implemented by a UE 115 or its components as described herein. For example, the operations of method 1800 may be performed by a UE communication manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may select an autonomous uplink mode for transmission in an unlicensed radio frequency spectrum band, wherein the autonomous uplink mode supports unscheduled uplink transmissions. The operations of block 1805 may be performed according to the methods described with reference to FIGS. 1 through 9. In certain examples, aspects of the operations of block 1805 may be performed by a uplink mode component as described with reference to FIGS. 10 through 13.

At block 1810 the UE 115 may transmit a first channel clearance signal based at least in part on selecting the autonomous uplink mode. The operations of block 1810 may be performed according to the methods described with reference to FIGS. 1 through 9. In certain examples, aspects of the operations of block 1810 may be performed by a RTS component as described with reference to FIGS. 10 through 13.

At block 1815 the UE 115 may receive a second channel clearance signal from a base station in response to the first channel clearance signal. The operations of block 1815 may be performed according to the methods described with reference to FIGS. 1 through 9. In certain examples, aspects of the operations of block 1815 may be performed by a CTS component as described with reference to FIGS. 10 through 13.

At block 1820 the UE 115 may transmit an uplink message in the unlicensed radio frequency spectrum band according to the autonomous uplink mode, wherein the uplink message may be transmitted based at least in part on receiving the second channel clearance signal. The operations of block 1820 may be performed according to the methods described with reference to FIGS. 1 through 9. In certain examples, aspects of the operations of block 1820 may be performed by a uplink message component as described with reference to FIGS. 10 through 13.

Figure 19:
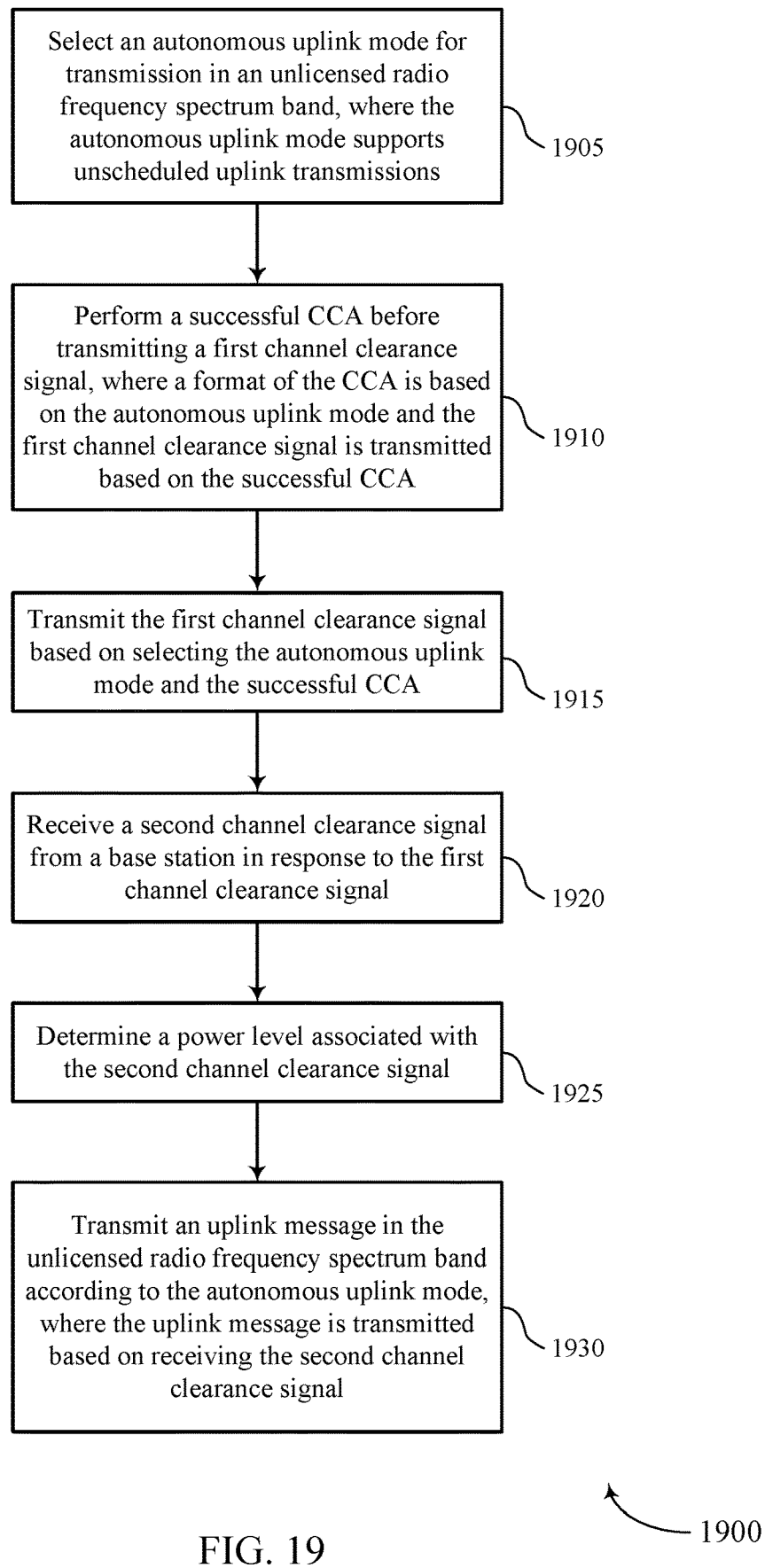

FIG. 19 shows a flowchart illustrating a method 1900 for autonomous uplink channel clearance signaling in accordance with various aspects of the present disclosure. The operations of method 1900 may be implemented by a UE 115 or its components as described herein. For example, the operations of method 1900 may be performed by a UE communication manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may select an autonomous uplink mode for transmission in an unlicensed radio frequency spectrum band, wherein the autonomous uplink mode supports unscheduled uplink transmissions. The operations of block 1905 may be performed according to the methods described with reference to FIGS. 1 through 9. In certain examples, aspects of the operations of block 1905 may be performed by a uplink mode component as described with reference to FIGS. 10 through 13.

At block 1910 the UE 115 may perform a successful CCA before transmitting the first channel clearance signal, wherein a format of the CCA may be based at least in part on the autonomous uplink mode and the first channel clearance signal may be transmitted based at least in part on the successful CCA. The operations of block 1910 may be performed according to the methods described with reference to FIGS. 1 through 9. In certain examples, aspects of the operations of block 1910 may be performed by a CCA component as described with reference to FIGS. 10 through 13.

At block 1915 the UE 115 may transmit a first channel clearance signal based at least in part on selecting the autonomous uplink mode. The operations of block 1915 may be performed according to the methods described with reference to FIGS. 1 through 9. In certain examples, aspects of the operations of block 1915 may be performed by a RTS component as described with reference to FIGS. 10 through 13.

At block 1920 the UE 115 may receive a second channel clearance signal from a base station in response to the first channel clearance signal. The operations of block 1920 may be performed according to the methods described with reference to FIGS. 1 through 9. In certain examples, aspects of the operations of block 1920 may be performed by a CTS component as described with reference to FIGS. 10 through 13.

At block 1925 the UE 115 may determine a power level associated with the second channel clearance signal, wherein the uplink message may be transmitted according to the autonomous uplink mode based at least in part on the determined power level. The operations of block 1925 may be performed according to the methods described with reference to FIGS. 1 through 9. In certain examples, aspects of the operations of block 1925 may be performed by a uplink message component as described with reference to FIGS. 10 through 13.

At block 1930 the UE 115 may transmit an uplink message in the unlicensed radio frequency spectrum band according to the autonomous uplink mode, wherein the uplink message may be transmitted based at least in part on receiving the second channel clearance signal. The operations of block 1930 may be performed according to the methods described with reference to FIGS. 1 through 9. In certain examples, aspects of the operations of block 1930 may be performed by a uplink message component as described with reference to FIGS. 10 through 13.

Figure 20:
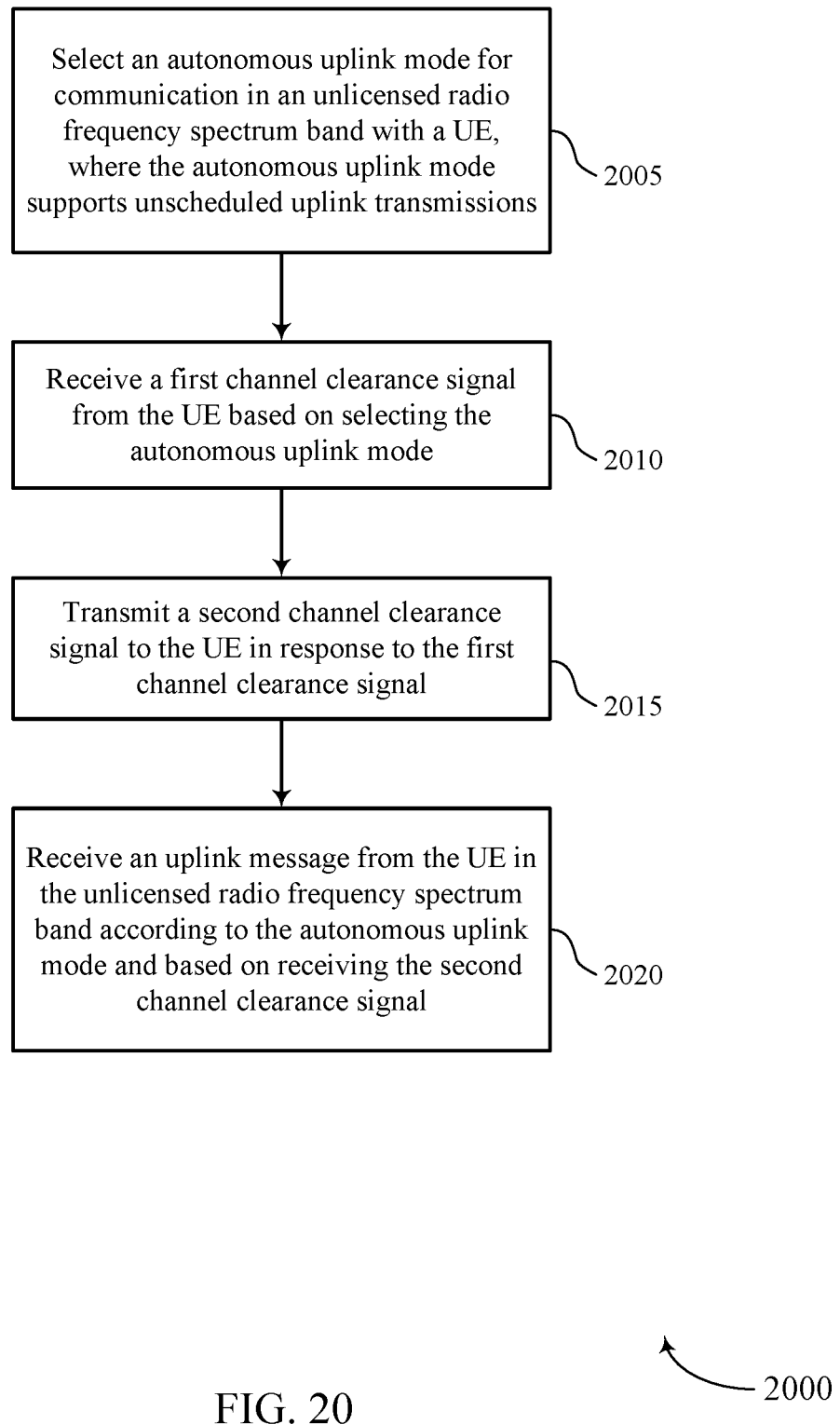

FIG. 20 shows a flowchart illustrating a method 2000 for autonomous uplink channel clearance signaling in accordance with various aspects of the present disclosure. The operations of method 2000 may be implemented by a base station 105 or its components as described herein. For example, the operations of method 2000 may be performed by a base station communication manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may select an autonomous uplink mode for communication in an unlicensed radio frequency spectrum band with a UE, wherein the autonomous uplink mode supports unscheduled uplink transmissions. The operations of block 2005 may be performed according to the methods described with reference to FIGS. 1 through 9. In certain examples, aspects of the operations of block 2005 may be performed by a uplink mode component as described with reference to FIGS. 14 through 17.

At block 2010 the base station 105 may receive a first channel clearance signal from the UE based at least in part on selecting the autonomous uplink mode. The operations of block 2010 may be performed according to the methods described with reference to FIGS. 1 through 9. In certain examples, aspects of the operations of block 2010 may be performed by a RTS component as described with reference to FIGS. 14 through 17.

At block 2015 the base station 105 may transmit a second channel clearance signal to the UE in response to the first channel clearance signal. The operations of block 2015 may be performed according to the methods described with reference to FIGS. 1 through 9. In certain examples, aspects of the operations of block 2015 may be performed by a CTS component as described with reference to FIGS. 14 through 17.

At block 2020 the base station 105 may receive an uplink message from the UE in the unlicensed radio frequency spectrum band according to the autonomous uplink mode and based at least in part on receiving the second channel clearance signal. The operations of block 2020 may be performed according to the methods described with reference to FIGS. 1 through 9. In certain examples, aspects of the operations of block 2020 may be performed by a uplink message component as described with reference to FIGS. 14 through 17.

Figure 21:
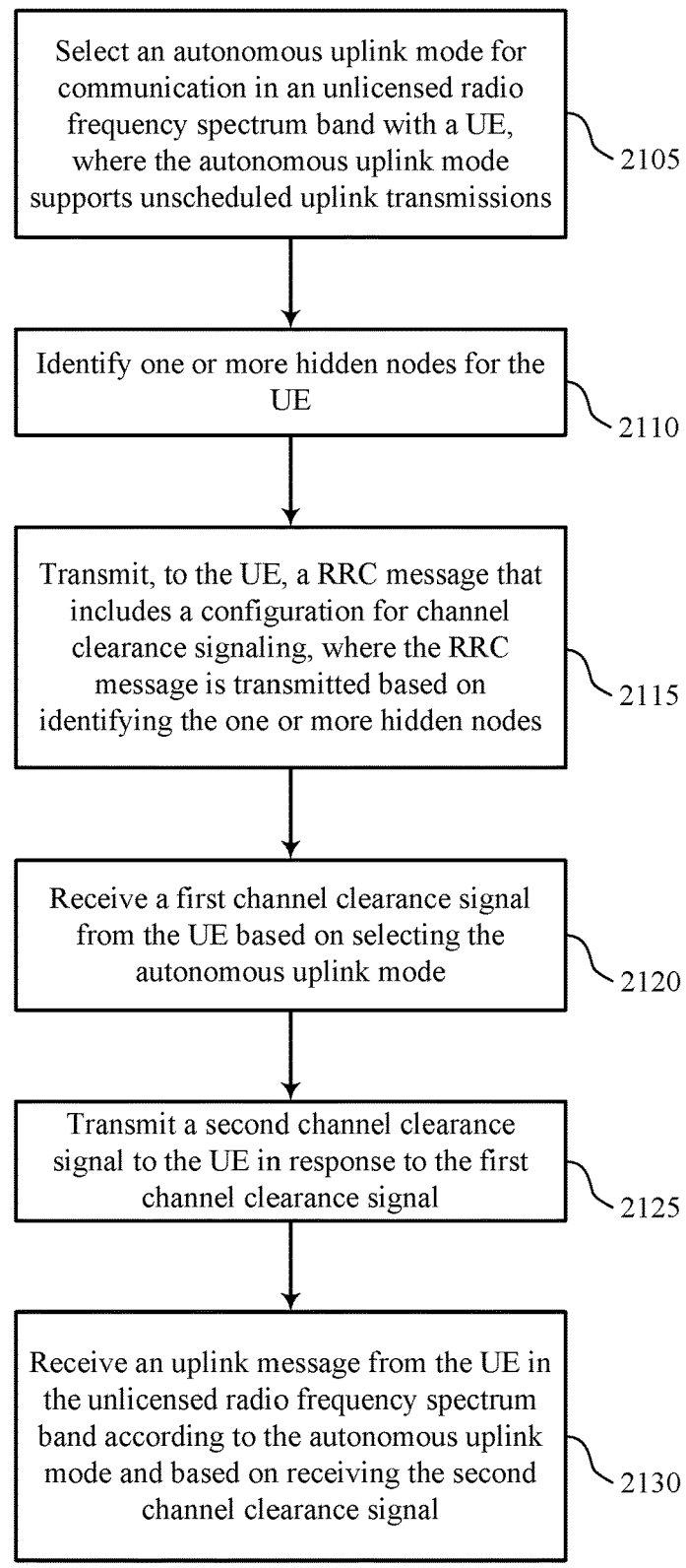

FIG. 21 shows a flowchart illustrating a method 2100 for autonomous uplink channel clearance signaling in accordance with various aspects of the present disclosure. The operations of method 2100 may be implemented by a base station 105 or its components as described herein. For example, the operations of method 2100 may be performed by a base station communication manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may select an autonomous uplink mode for communication in an unlicensed radio frequency spectrum band with a UE, wherein the autonomous uplink mode supports unscheduled uplink transmissions. The operations of block 2105 may be performed according to the methods described with reference to FIGS. 1 through 9. In certain examples, aspects of the operations of block 2105 may be performed by a uplink mode component as described with reference to FIGS. 14 through 17.

At block 2110 the base station 105 may identify one or more hidden nodes for the UE, wherein the RRC message may be transmitted based at least in part on identifying the one or more hidden nodes. The operations of block 2110 may be performed according to the methods described with reference to FIGS. 1 through 9. In certain examples, aspects of the operations of block 2110 may be performed by a node identification component as described with reference to FIGS. 14 through 17.

At block 2115 the base station 105 may transmit, to the UE, an RRC message that comprises a configuration for channel clearance signaling, wherein the second channel clearance signal may be transmitted based at least in part on transmitting the configuration. The operations of block 2115 may be performed according to the methods described with reference to FIGS. 1 through 9. In certain examples, aspects of the operations of block 2115 may be performed by a RRC component as described with reference to FIGS. 14 through 17.

At block 2120 the base station 105 may receive a first channel clearance signal from the UE based at least in part on selecting the autonomous uplink mode. The operations of block 2120 may be performed according to the methods described with reference to FIGS. 1 through 9. In certain examples, aspects of the operations of block 2120 may be performed by a RTS component as described with reference to FIGS. 14 through 17.

At block 2125 the base station 105 may transmit a second channel clearance signal to the UE in response to the first channel clearance signal. The operations of block 2125 may be performed according to the methods described with reference to FIGS. 1 through 9. In certain examples, aspects of the operations of block 2125 may be performed by a CTS component as described with reference to FIGS. 14 through 17.

At block 2130 the base station 105 may receive an uplink message from the UE in the unlicensed radio frequency spectrum band according to the autonomous uplink mode and based at least in part on receiving the second channel clearance signal. The operations of block 2130 may be performed according to the methods described with reference to FIGS. 1 through 9. In certain examples, aspects of the operations of block 2130 may be performed by a uplink message component as described with reference to FIGS. 14 through 17.

Figure 22:
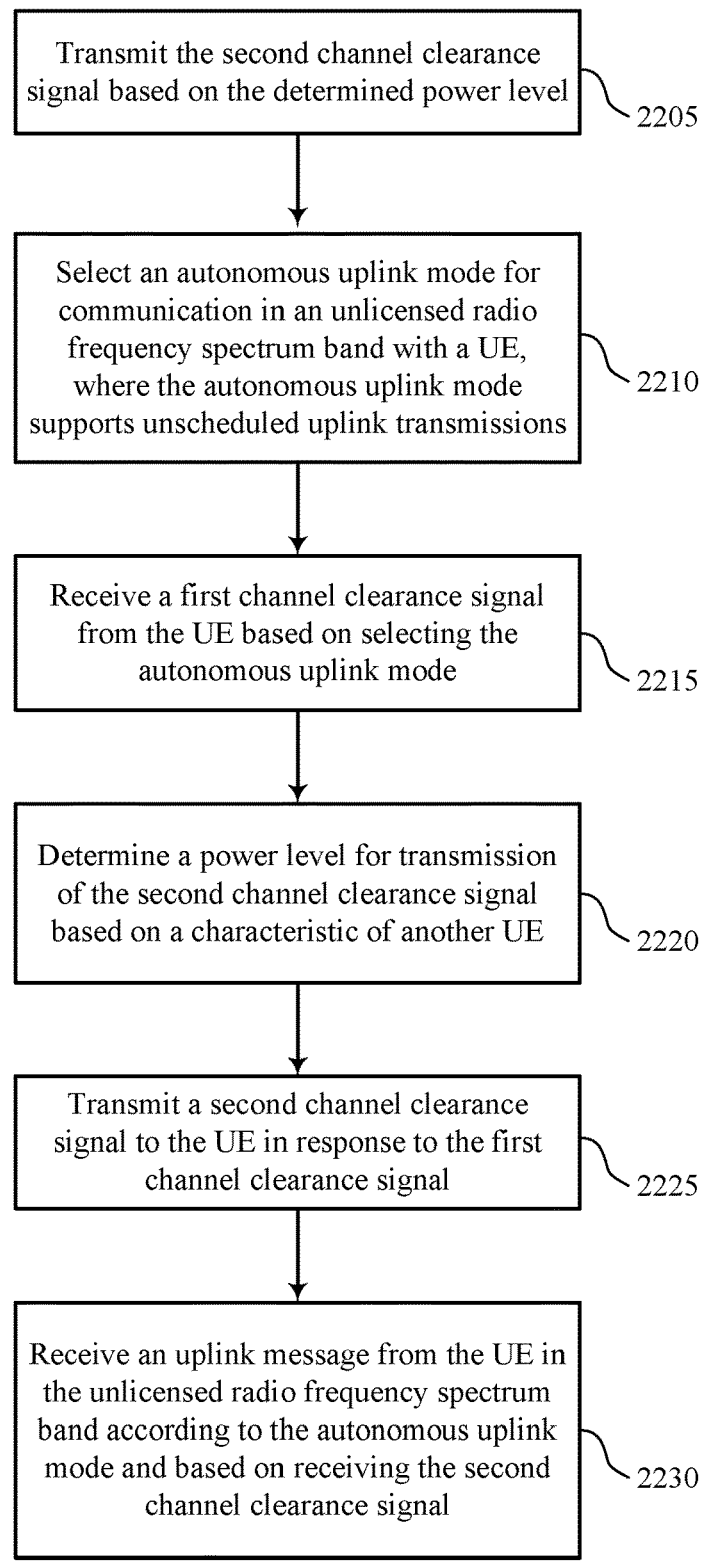

FIG. 22 shows a flowchart illustrating a method 2200 for autonomous uplink channel clearance signaling in accordance with various aspects of the present disclosure. The operations of method 2200 may be implemented by a base station 105 or its components as described herein. For example, the operations of method 2200 may be performed by a base station communication manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At block 2205 the base station 105 may transmit the second channel clearance signal based at least in part on the determined power level. The operations of block 2205 may be performed according to the methods described with reference to FIGS. 1 through 9. In certain examples, aspects of the operations of block 2205 may be performed by a CTS component as described with reference to FIGS. 14 through 17.

At block 2210 the base station 105 may select an autonomous uplink mode for communication in an unlicensed radio frequency spectrum band with a UE, wherein the autonomous uplink mode supports unscheduled uplink transmissions. The operations of block 2210 may be performed according to the methods described with reference to FIGS. 1 through 9. In certain examples, aspects of the operations of block 2210 may be performed by a uplink mode component as described with reference to FIGS. 14 through 17.

At block 2215 the base station 105 may receive a first channel clearance signal from the UE based at least in part on selecting the autonomous uplink mode. The operations of block 2215 may be performed according to the methods described with reference to FIGS. 1 through 9. In certain examples, aspects of the operations of block 2215 may be performed by a RTS component as described with reference to FIGS. 14 through 17.

At block 2220 the base station 105 may determine a power level for transmission of the second channel clearance signal based at least in part on a characteristic of another UE. The operations of block 2220 may be performed according to the methods described with reference to FIGS. 1 through 9. In certain examples, aspects of the operations of block 2220 may be performed by a CTS power component as described with reference to FIGS. 14 through 17.

At block 2225 the base station 105 may transmit a second channel clearance signal to the UE in response to the first channel clearance signal. The operations of block 2225 may be performed according to the methods described with reference to FIGS. 1 through 9. In certain examples, aspects of the operations of block 2225 may be performed by a CTS component as described with reference to FIGS. 14 through 17.

At block 2230 the base station 105 may receive an uplink message from the UE in the unlicensed radio frequency spectrum band according to the autonomous uplink mode and based at least in part on receiving the second channel clearance signal. The operations of block 2230 may be performed according to the methods described with reference to FIGS. 1 through 9. In certain examples, aspects of the operations of block 2230 may be performed by a uplink message component as described with reference to FIGS. 14 through 17.

Figure 23:
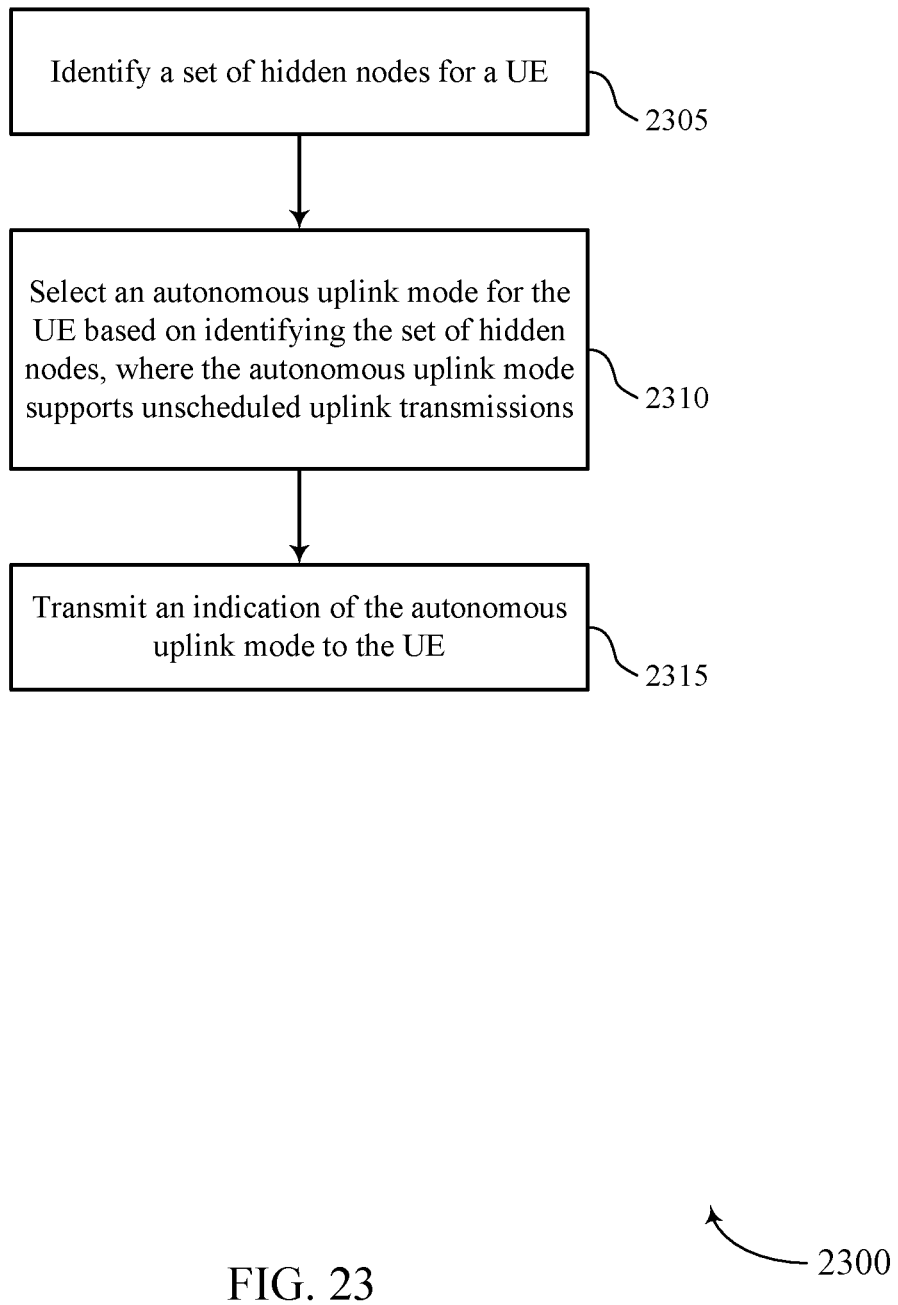

FIG. 23 shows a flowchart illustrating a method 2300 for autonomous uplink benefit identification in accordance with various aspects of the present disclosure. The operations of method 2300 may be implemented by a base station 105 or its components as described herein. For example, the operations of method 2300 may be performed by a base station communication manager as described with reference to FIGS. 14 through 17. In some examples, a base station 105 may execute a set of codes to control the functional elements of the device to perform the functions described below. Additionally or alternatively, the base station 105 may perform aspects the functions described below using special-purpose hardware.

At block 2305 the base station 105 may identify a set of hidden nodes for a UE. The operations of block 2305 may be performed according to the methods described with reference to FIGS. 1 through 9. In certain examples, aspects of the operations of block 2305 may be performed by a node identification component as described with reference to FIGS. 14 through 1711.

At block 2310 the base station 105 may select an autonomous uplink mode for the UE based at least in part on identifying the set of hidden nodes, wherein the autonomous uplink mode supports unscheduled uplink transmissions. The operations of block 2310 may be performed according to the methods described with reference to FIGS. 1 through 9. In certain examples, aspects of the operations of block 2310 may be performed by a mode selection component as described with reference to FIGS. 14 through 17.

At block 2315 the base station 105 may transmit an indication of the autonomous uplink mode to the UE. The operations of block 2315 may be performed according to the methods described with reference to FIGS. 1 through 9. In certain examples, aspects of the operations of block 2315 may be performed by an indication transmitting component as described with reference to FIGS. 14 through 17.

Figure 24:
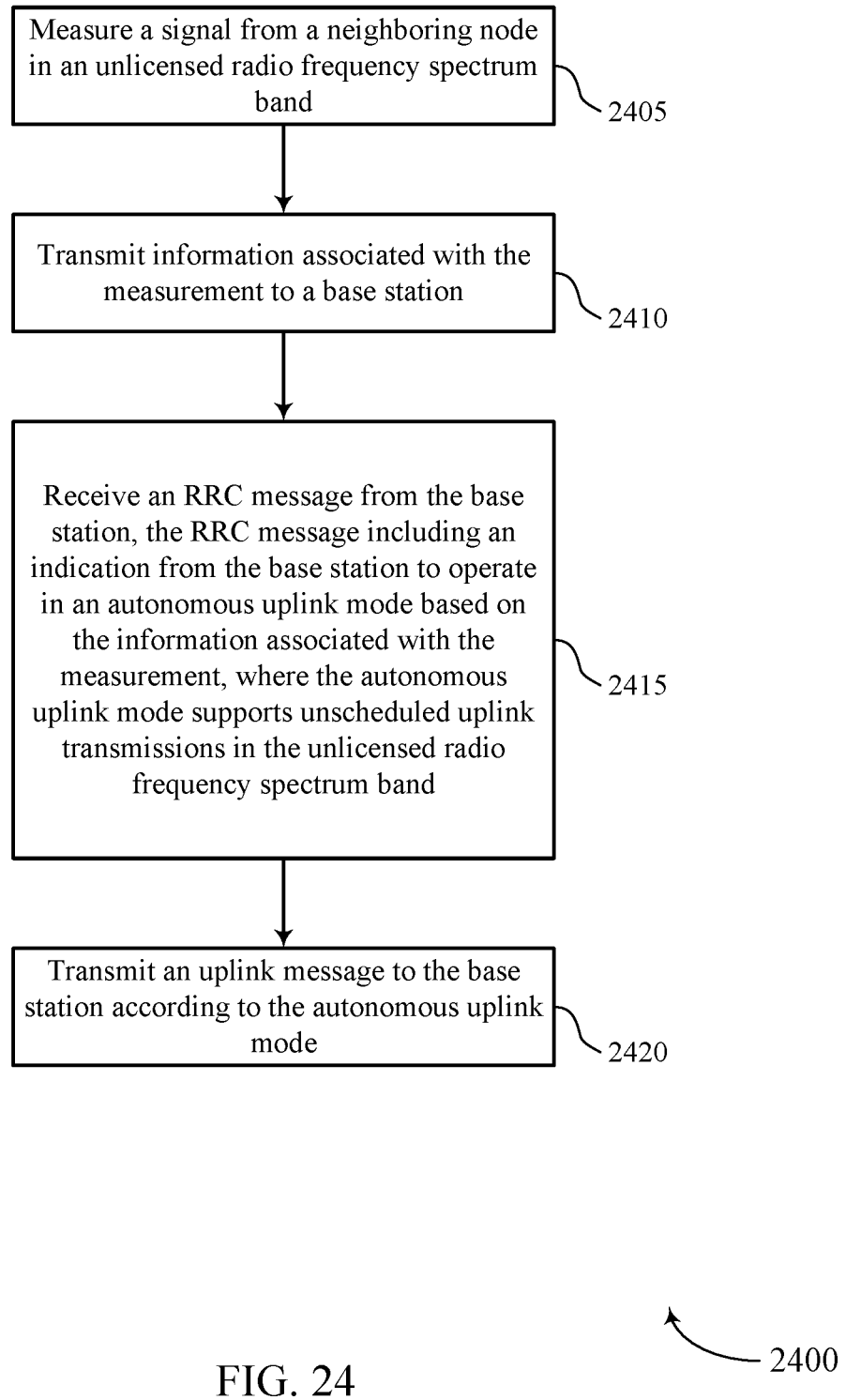

FIG. 24 shows a flowchart illustrating a method 2400 for autonomous uplink benefit identification in accordance with various aspects of the present disclosure. The operations of method 2400 may be implemented by a UE 115 or its components as described herein. For example, the operations of method 2400 may be performed by a UE communication manager as described with reference to FIGS. 10 through 13. In some examples, a UE 115 may execute a set of codes to control the functional elements of the device to perform the functions described below. Additionally or alternatively, the UE 115 may perform aspects the functions described below using special-purpose hardware.

At block 2405 the UE 115 may measure a signal from a neighboring node in an unlicensed radio frequency spectrum band. The operations of block 2405 may be performed according to the methods described with reference to FIGS. 1 through 9. In certain examples, aspects of the operations of block 2405 may be performed by a signal measurement component as described with reference to FIGS. 10 through 13.

At block 2410 the UE 115 may transmit information associated with the measurement to a base station. The operations of block 2410 may be performed according to the methods described with reference to FIGS. 1 through 9. In certain examples, aspects of the operations of block 2410 may be performed by an information transmitting component as described with reference to FIGS. 10 through 13.

At block 2415 the UE 115 may receive a RRC message from the base station, the RRC message comprising an indication from the base station to operate in an autonomous uplink mode based at least in part on the information associated with the measurement, wherein the autonomous uplink mode supports unscheduled uplink transmissions in the unlicensed radio frequency spectrum band. The operations of block 2415 may be performed according to the methods described with reference to FIGS. 1 through 9. In certain examples, aspects of the operations of block 2415 may be performed by a RRC receiving component as described with reference to FIGS. 10 through 13.

At block 2420 the UE 115 may transmit an uplink message to the base station according to the autonomous uplink mode. The operations of block 2420 may be performed according to the methods described with reference to FIGS. 1 through 9. In certain examples, aspects of the operations of block 2420 may be performed by a message transmitting component as described with reference to FIGS. 10 through 13.

It should be noted that the methods described above describe possible implementations, and that the operations and the steps may be rearranged or otherwise modified and that other implementations are possible. Furthermore, aspects from two or more of the methods described above may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of Universal Mobile Telecommunications System (UMTS) that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   selecting an autonomous uplink mode for transmission in an unlicensed radio frequency spectrum band, wherein the autonomous uplink mode supports unscheduled uplink transmissions;
   transmitting a first channel clearance signal based at least in part on selecting the autonomous uplink mode;
   receiving a second channel clearance signal in response to the first channel clearance signal, the second channel clearance signal indicating that the unlicensed radio frequency spectrum band is unoccupied, wherein one or both of the first channel clearance signal or the second channel clearance signal comprises one or more communication parameters for communicating according to the autonomous uplink mode, the one or more communication parameters comprising at least a frame structure indication and a transmission opportunity (TxOP) duration for the autonomous uplink mode; and
   transmitting an uplink message in the unlicensed radio frequency spectrum band according to the frame structure indication in the autonomous uplink mode, wherein the uplink message is transmitted based at least in part on receiving the second channel clearance signal.

2. The method of claim 1, further comprising:
   performing a successful clear channel assessment (CCA) before transmitting the first channel clearance signal, wherein a format of the CCA is based at least in part on the autonomous uplink mode and the first channel clearance signal is transmitted based at least in part on the successful CCA.

3. The method of claim 1, further comprising:
   receiving a radio resource control (RRC) message that comprises a configuration for the first channel clearance signal, wherein the first channel clearance signal is transmitted based at least in part on receiving the configuration.

4. The method of claim 1, wherein the first channel clearance signal comprises a request-to-send (RTS) message and the second channel clearance signal comprises a clear-to-send (CTS) message.

5. The method of claim 1, wherein the first channel clearance signal comprises a UE identifier.

6. The method of claim 1, wherein the first channel clearance signal is transmitted and the second channel clearance signal is received in a same transmission time interval (TTI).

7. The method of claim 1, further comprising:
determining a power level for transmission of the first channel clearance signal based at least in part on a characteristic of another UE; and
transmitting the first channel clearance signal based at least in part on the determined power level.

8. The method of claim 1, further comprising:
identifying a signal strength indicator associated with a neighbor wireless node; and
determining a power level associated with the second channel clearance signal based at least in part on the signal strength indicator, wherein the uplink message is transmitted according to the autonomous uplink mode based at least in part on the determined power level.

9. The method of claim 1, wherein the frame structure indication comprises a time division duplex scheme (TDD) configuration for the autonomous uplink mode.

10. The method of claim 1, wherein the one or more communication parameters comprises a modulation and coding scheme for the autonomous uplink mode or hybrid automatic repeat request (HARD) information for the autonomous uplink mode, or any combination thereof.

11. An apparatus for wireless communication, in a system comprising:
a processor;
memory in electronic communication with the processor; and
instructions stored in the memory and operable, when executed by the processor, to cause the apparatus to:
select an autonomous uplink mode for transmission in an unlicensed radio frequency spectrum band, wherein the autonomous uplink mode supports unscheduled uplink transmissions;
transmit a first channel clearance signal based at least in part on selecting the autonomous uplink mode;
receive a second channel clearance signal in response to the first channel clearance signal, the second channel clearance signal indicating that the unlicensed radio frequency spectrum band is unoccupied, wherein one or both of the first channel clearance signal or the second channel clearance signal comprises one or more communication parameters for communicating according to the autonomous uplink mode, the one or more communication parameters comprising at least a frame structure indication and a transmission opportunity (TxOP) duration for the autonomous uplink mode; and
transmit an uplink message in the unlicensed radio frequency spectrum band according to the frame structure indication in the autonomous uplink mode, wherein the uplink message is transmitted based at least in part on receiving the second channel clearance signal.

12. The apparatus of claim 11, wherein the instructions are executable by the processor to cause the apparatus to:
perform a successful clear channel assessment (CCA) before transmitting the first channel clearance signal, wherein a format of the CCA is based at least in part on the autonomous uplink mode; and
transmit the first channel clearance signal based at least in part on the successful CCA.

13. The apparatus of claim 11, wherein the instructions are executable by the processor to cause the apparatus to:
receive a radio resource control (RRC) message that comprises a configuration for the first channel clearance signal; and
transmit the first channel clearance signal based at least in part on receiving the configuration.

14. The apparatus of claim 11, wherein the instructions are executable by the processor to cause the apparatus to:
transmit the first channel clearance signal and receive the second channel clearance signal in a same transmission time interval (TTI).

15. The apparatus of claim 11, wherein the instructions are executable by the processor to cause the apparatus to:
identify a signal strength indicator associated with a neighbor wireless node;
determine a power level associated with the second channel clearance signal; and
transmit the uplink message according to the autonomous uplink mode based at least in part on the determined power level.

16. The apparatus of claim 11, wherein the frame structure indication comprises a time division duplex scheme (TDD) configuration for the autonomous uplink mode.

17. The apparatus of claim 11, wherein the one or more communication parameters comprises a modulation and coding scheme for the autonomous uplink mode or hybrid automatic repeat request (HARQ) information for the autonomous uplink mode, or any combination thereof.

* * * * *